Aug. 28, 1962 J. C. M. FROST ET AL 3,051,417
AIRCRAFT CONTROL SYSTEMS
Filed Aug. 6, 1959 31 Sheets-Sheet 1

INVENTORS
J. C. M. FROST
BY C. J. WILLIAMS

*Maybee & Legris*
ATTORNEYS

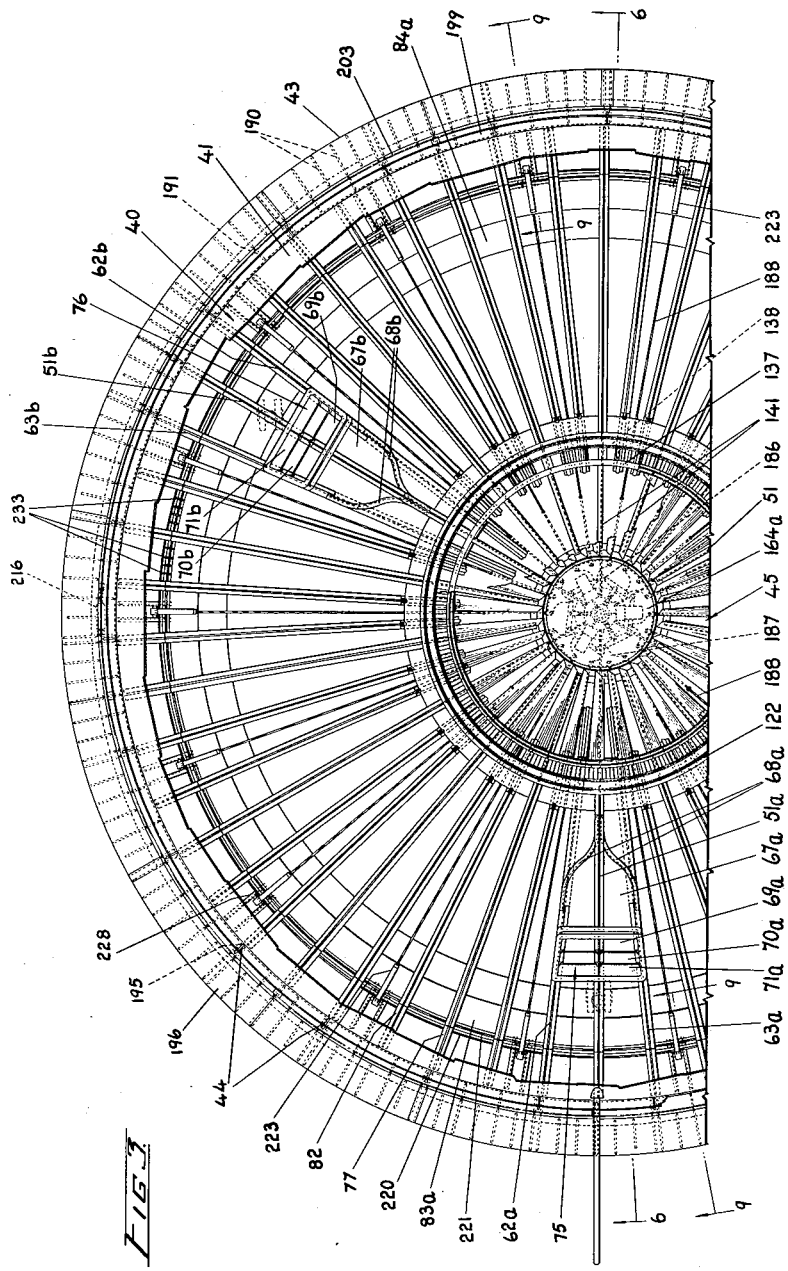

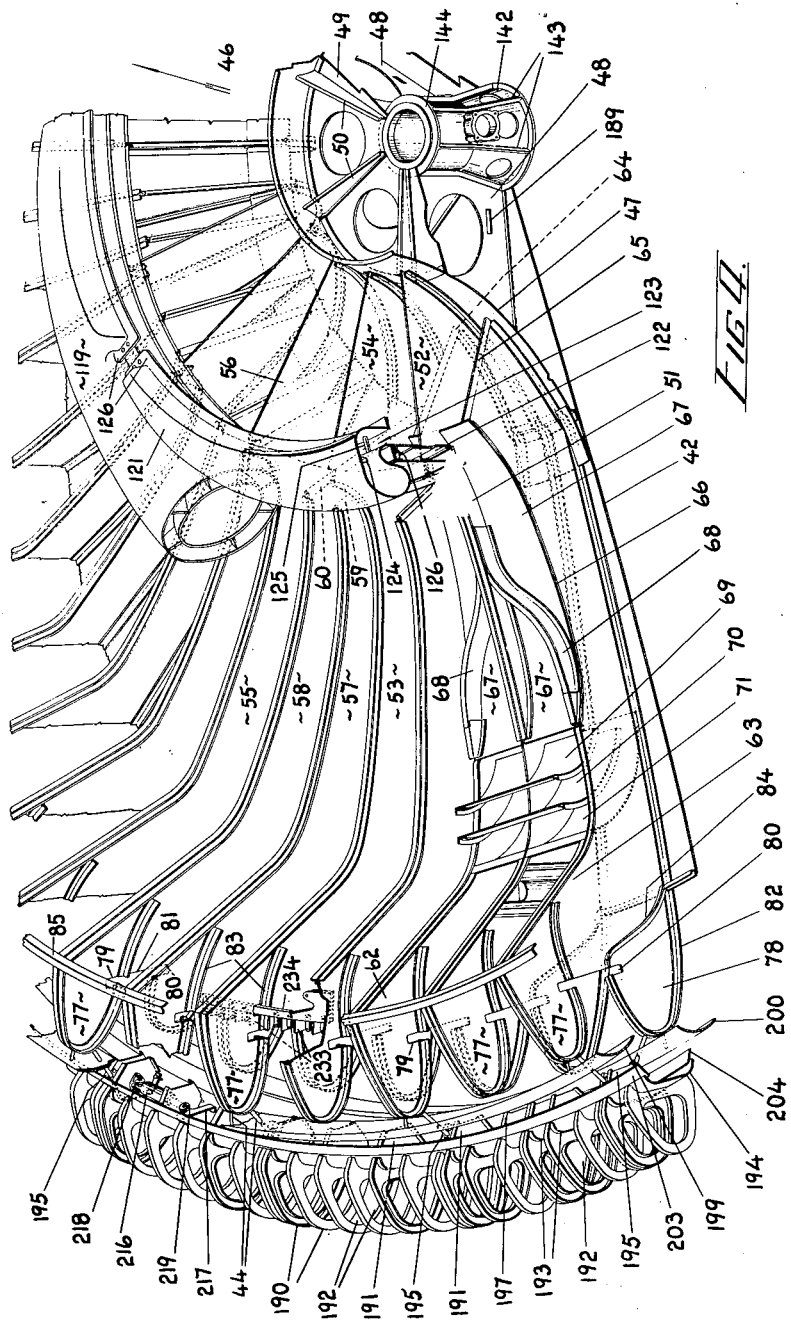

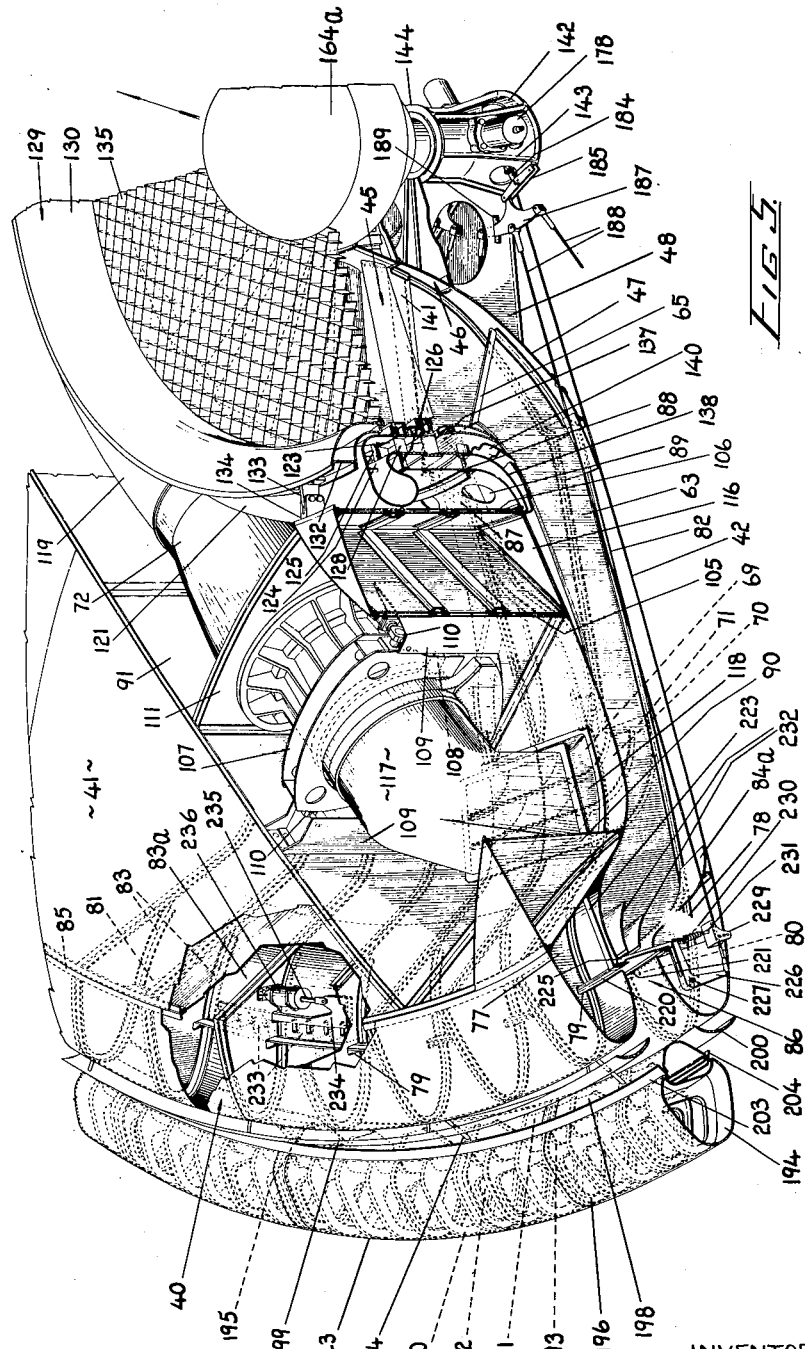

INVENTORS
J.C.M.FROST
C.J.WILLIAMS
BY
Maybee & Legris
ATTORNEYS

Aug. 28, 1962    J. C. M. FROST ET AL    3,051,417
AIRCRAFT CONTROL SYSTEMS
Filed Aug. 6, 1959                        31 Sheets-Sheet 7
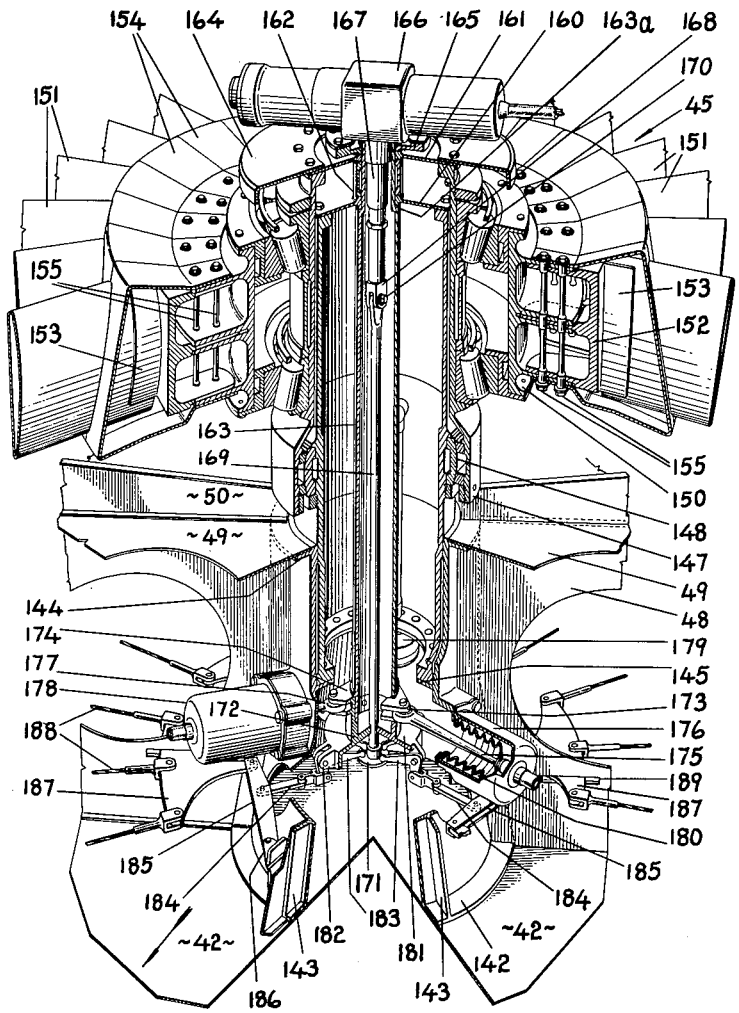
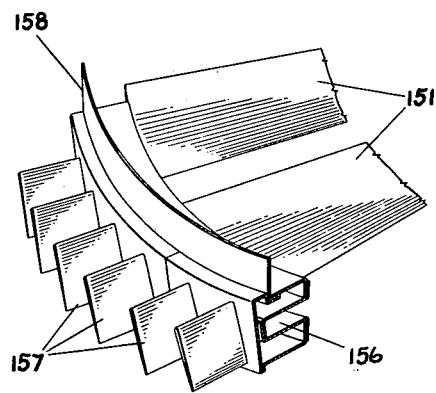
INVENTORS
J.C.M. FROST
C.J. WILLIAMS
BY
Maybee & Legris
ATTORNEYS

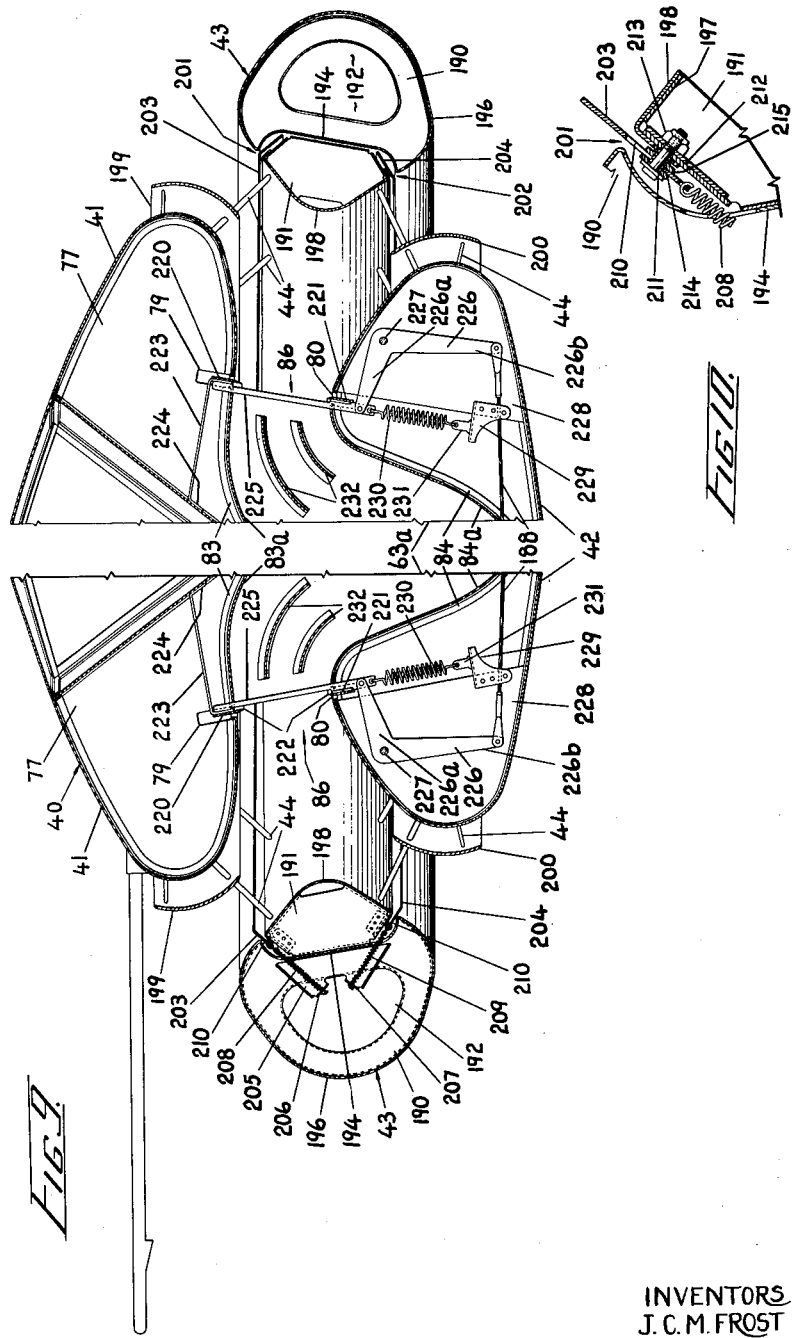

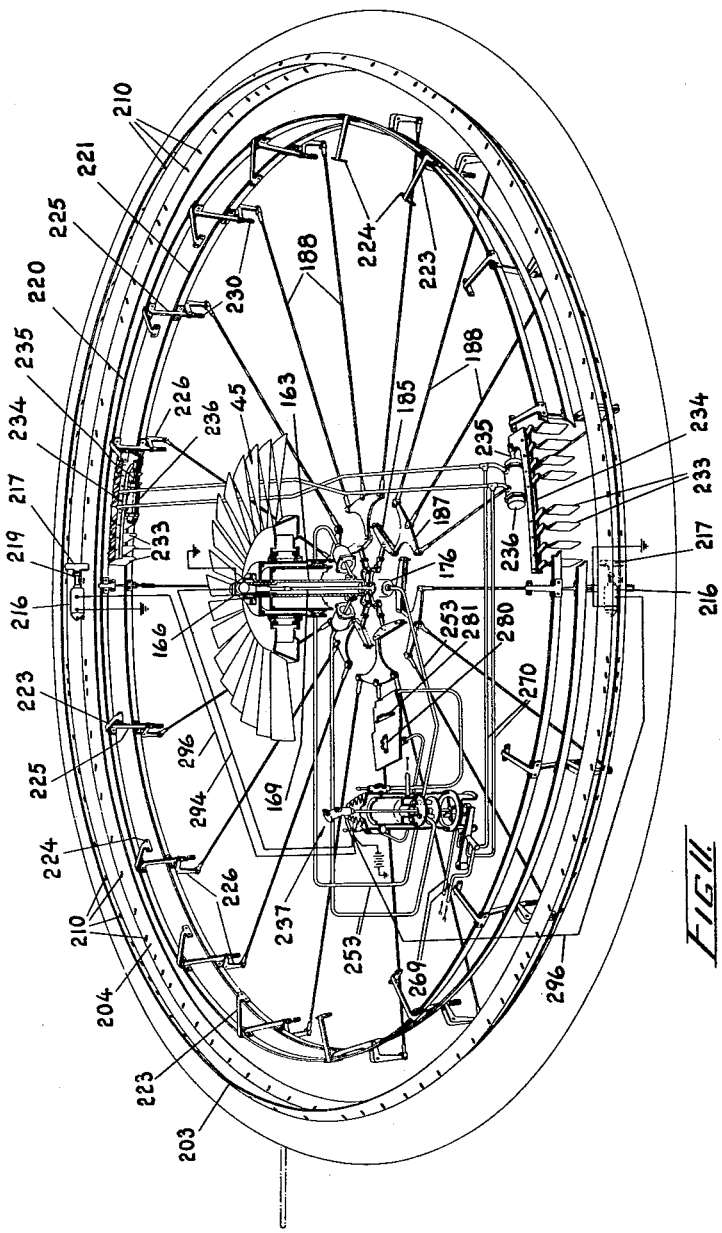

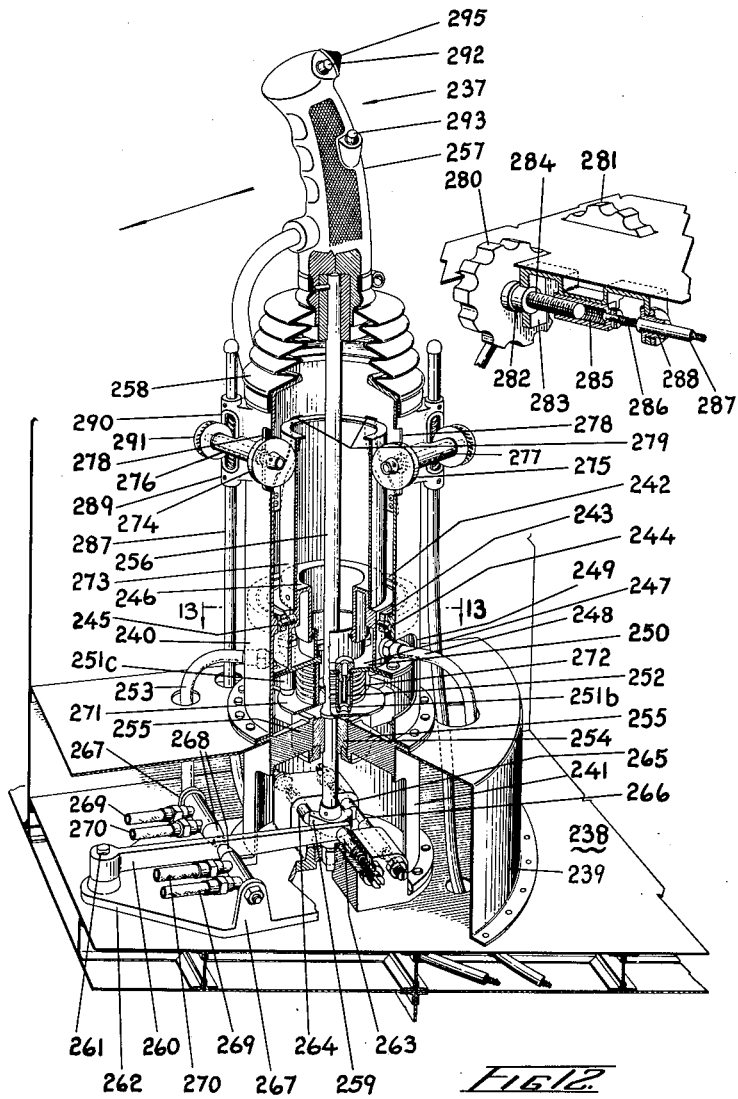

Aug. 28, 1962         J. C. M. FROST ET AL         3,051,417
                      AIRCRAFT CONTROL SYSTEMS
Filed Aug. 6, 1959                          31 Sheets-Sheet 11
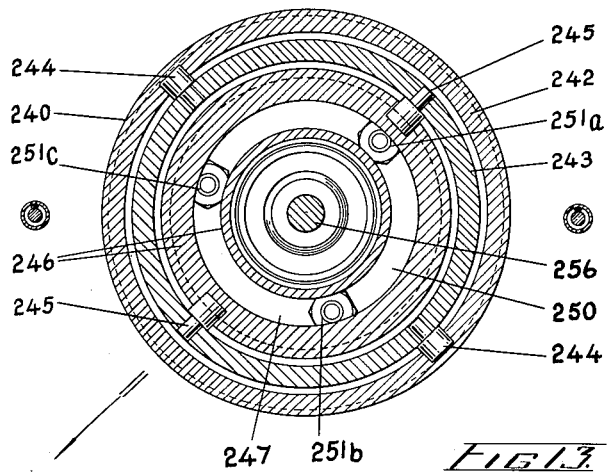
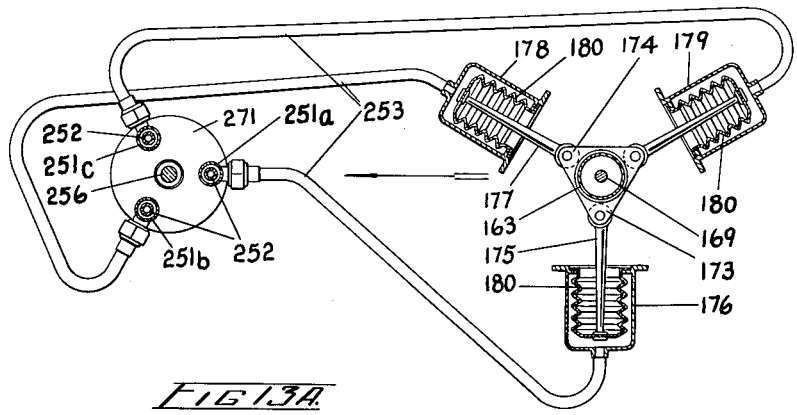
INVENTORS
J. C. M. FROST
C. J. WILLIAMS
BY
Maybee & Legris
ATTORNEYS

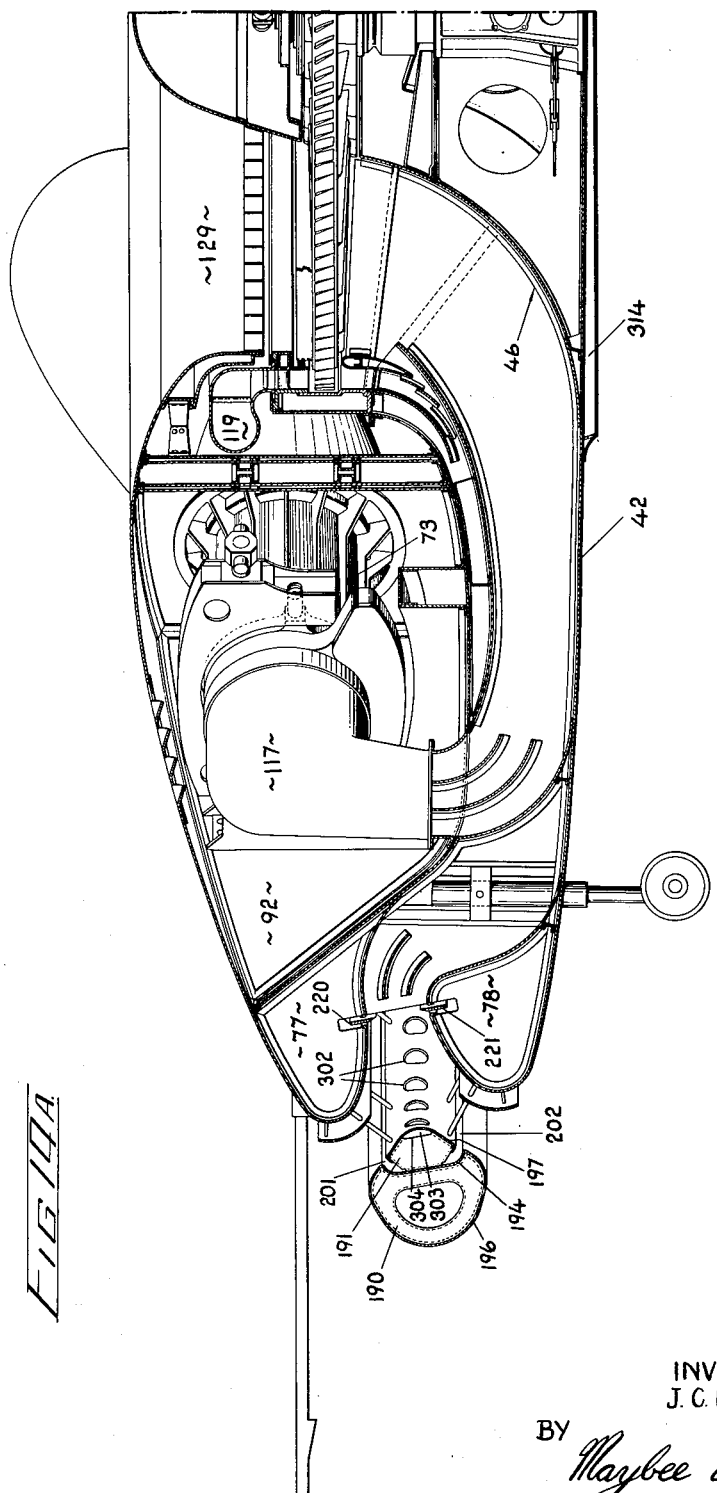

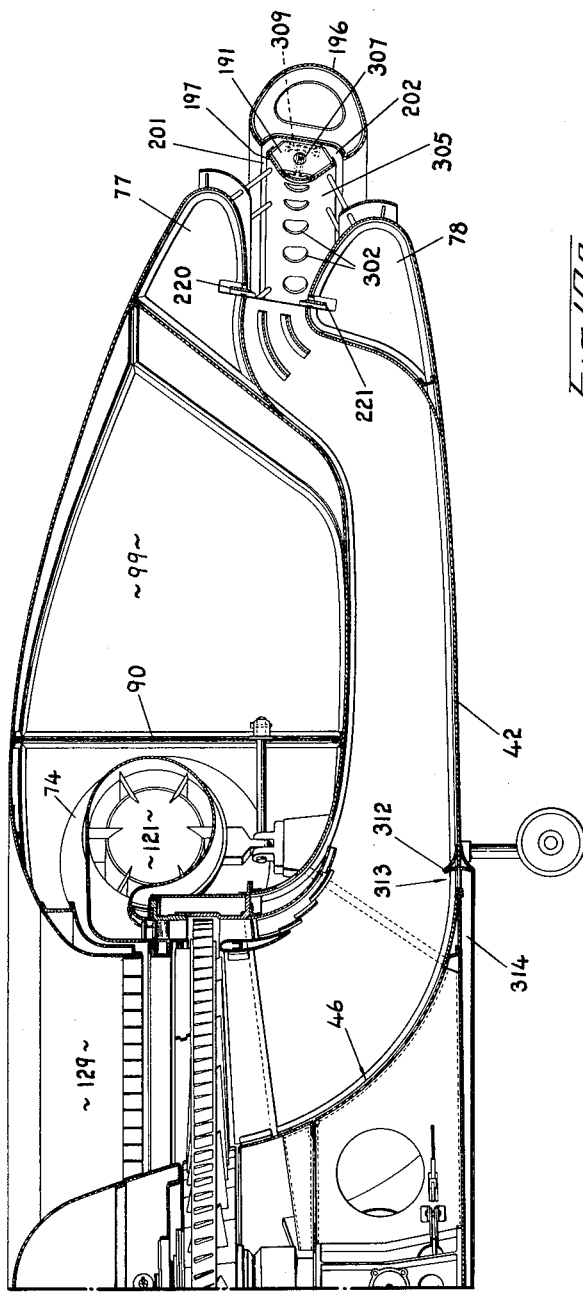

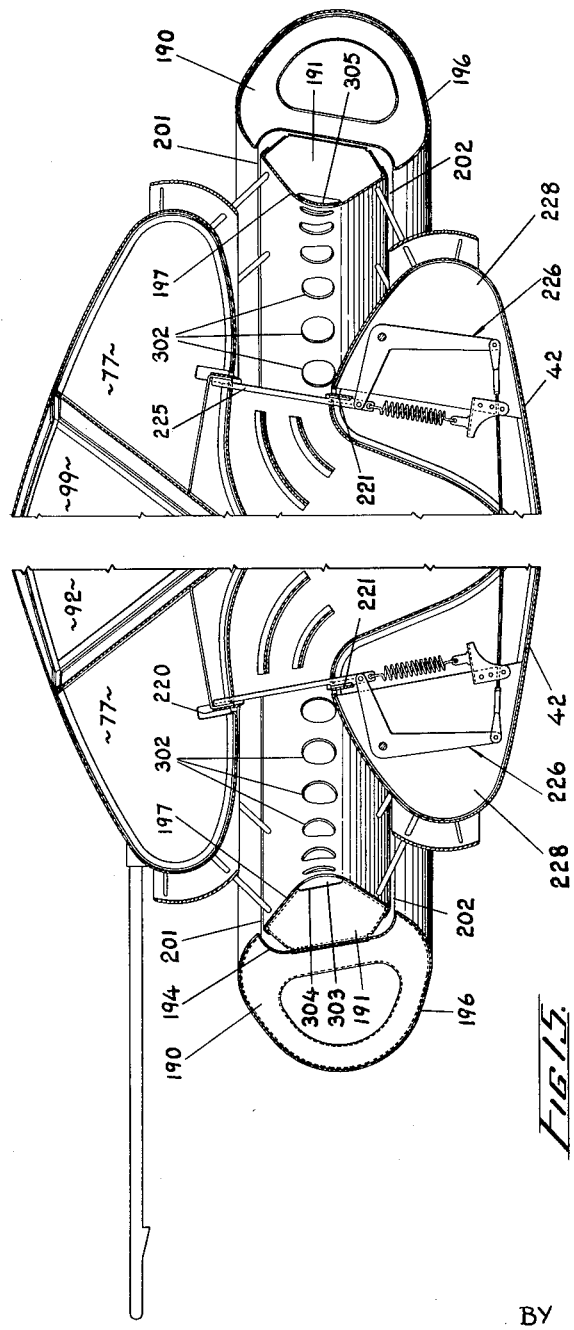

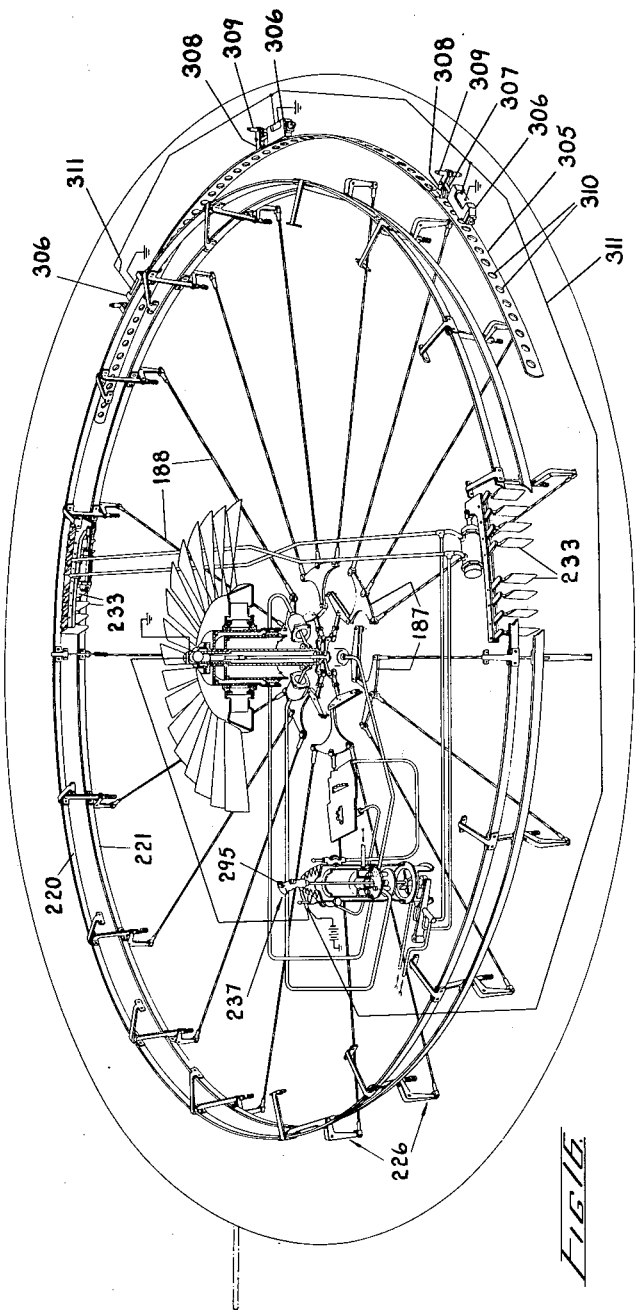

INVENTORS
J. C. M. FROST
C. J. WILLIAMS
BY
Maybee & Legris
ATTORNEYS

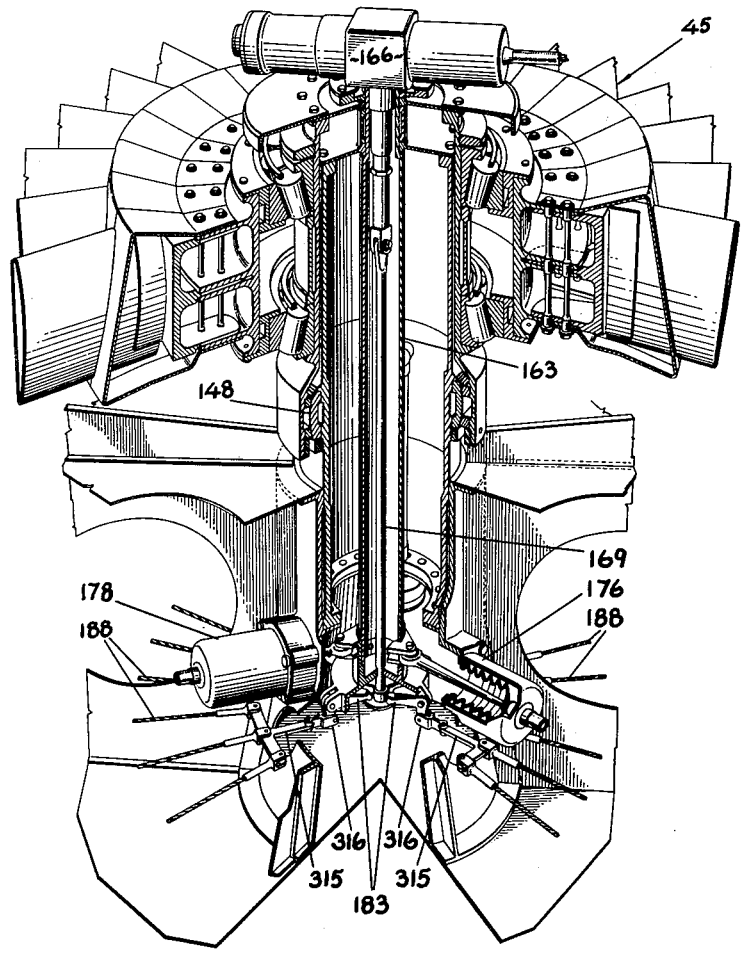

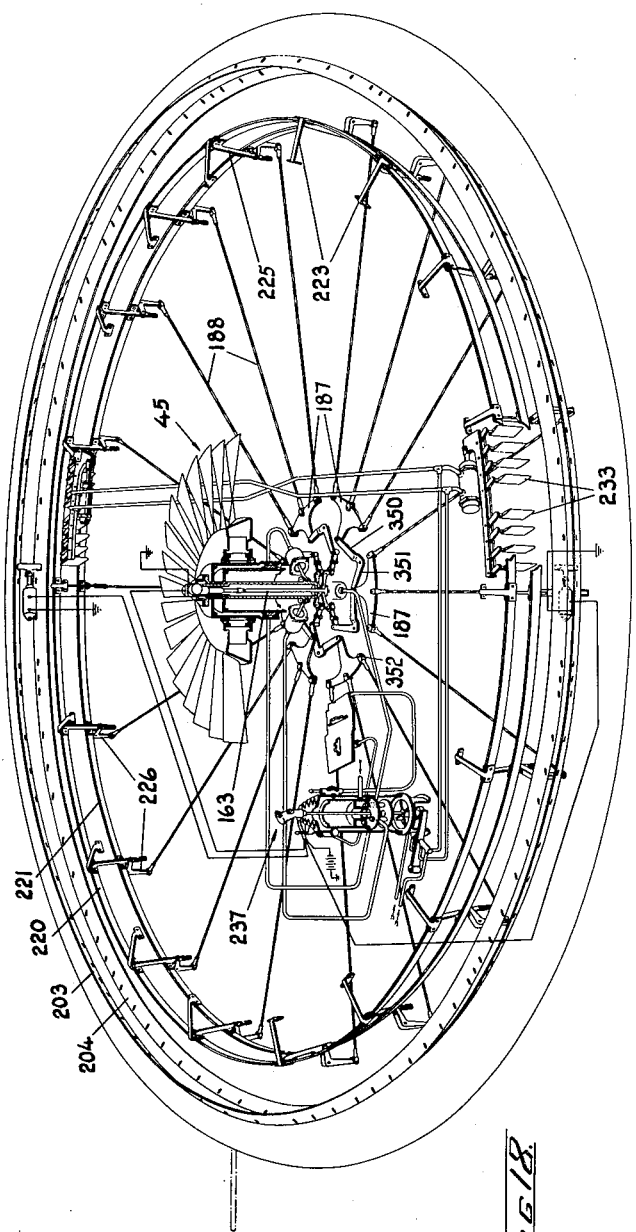

Aug. 28, 1962    J. C. M. FROST ET AL    3,051,417
AIRCRAFT CONTROL SYSTEMS

Filed Aug. 6, 1959    31 Sheets-Sheet 20

INVENTORS
J. C. M. FROST
C. J. WILLIAMS
BY
Maybee & Legris
ATTORNEYS

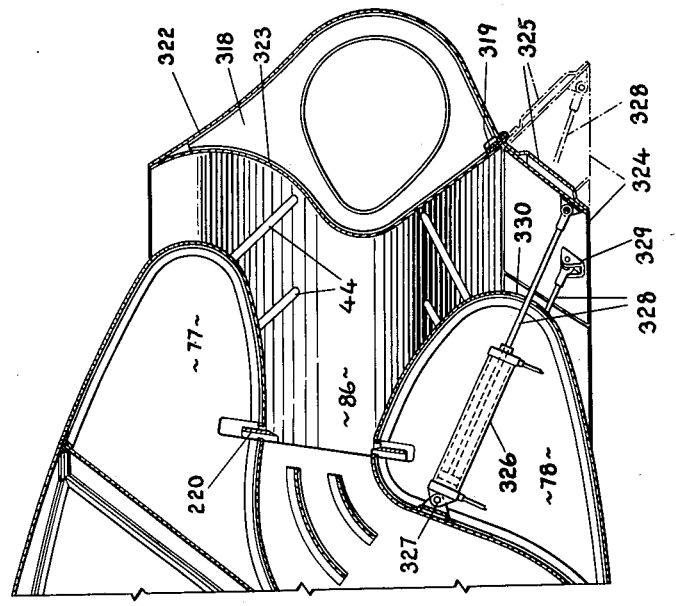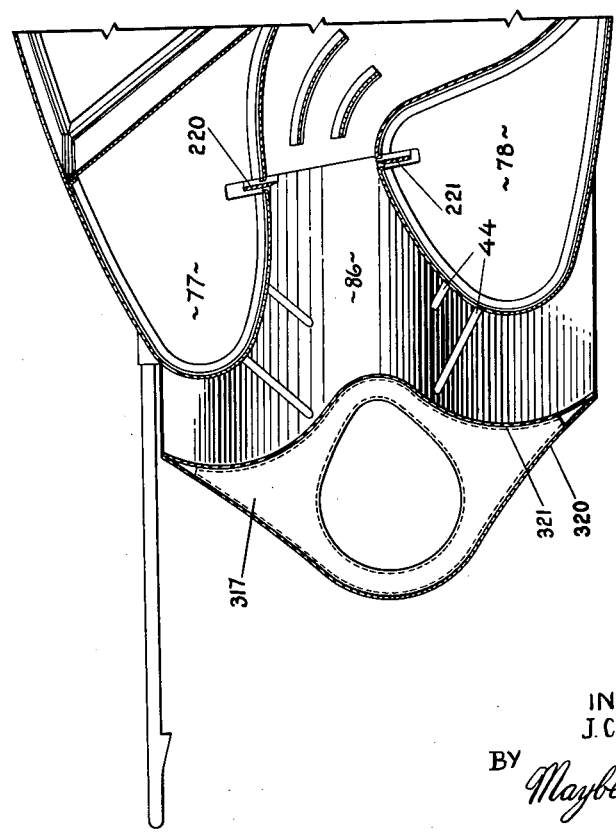
FIG.21

INVENTORS
J. C. M. FROST
C. J. WILLIAMS
BY Maybee & Legris
ATTORNEYS

Aug. 28, 1962  J. C. M. FROST ET AL  3,051,417
AIRCRAFT CONTROL SYSTEMS

Filed Aug. 6, 1959  31 Sheets-Sheet 23

INVENTORS
J. C. M. FROST
C. J. WILLIAMS
BY Maybee & Legris
ATTORNEYS

United States Patent Office 3,051,417
Patented Aug. 28, 1962

3,051,417
AIRCRAFT CONTROL SYSTEMS
John Carver Meadows Frost, Georgetown, Ontario, and Claude John Williams, Downsview, Ontario, Canada, assignors to Avco Aircraft Limited, Malton, Ontario, Canada, a corporation
Filed Aug. 6, 1959, Ser. No. 832,406
17 Claims. (Cl. 244—79)

This invention relates to aircraft control systems and more particularly to a control system for an aircraft having a body structure and an outlet nozzle arranged to discharge at a multiplicity of positions distributed around the periphery of the structure.

An example of such an aircraft is disclosed in co-pending application Serial No. 684,615 (which is a continuation of patent application Serial No. 502,156, dated April 18, 1955, now abandoned) dated September 17, 1957, and filed by John Dubbury, John Carver Meadows Frost and Thomas Desmond Earl. The application describes a circular aircraft having a body structure of generally lenticular form which is sheathed by opposed aerofoil surfaces which provide lift developing surfaces. That aircraft includes a gas displacement passage in the structure having an intake and having a substantially annular outlet adjacent to the periphery of the structure. Means are provided for impelling gas to flow through the passage from the intake to the outlet in a plurality of centrifugal directions relative to the yaw axis of the aircraft and to eject the gas at high velocity from the outlet generally radially of the yaw axis and at a multiplicity of positions distributed around the periphery. Gas directing means are provided associated with the outlet and adjustable to selectively alter the directions in which the gas leaves the outlet. In a preferred form of the aircraft disclosed in application Serial No. 684,615, the gas directing means comprises a perimetrical Coanda nozzle which encompasses the outlet to alter the direction of flow of the ejected gas.

It is an object of the present invention to provide, in an aircraft having an outlet nozzle arranged to discharge propulsive gas at a multiplicity of positions distributed around the body structure of the aircraft, a control system to reduce the divergence of the aircraft when it encounters a disturbance resulting in a tilt rate.

The invention will now be described by way of example with reference to the accompanying drawings, in which like reference characters indicate similar parts throughout the several views and in which:

FIGURE 3 is a partial plan, partly broken away and partly in section, of the aircraft of FIGURES 1 and 2;

FIGURE 4 is a perspective view of a portion of the aircraft in partly assembled state and showing the rib structure of the aircraft;

FIGURE 5 is a perspective view of a portion of the completed aircraft similar to that shown in FIGURE 4 and is partly broken away to show the internal structure of the aircraft;

Figure 6A:
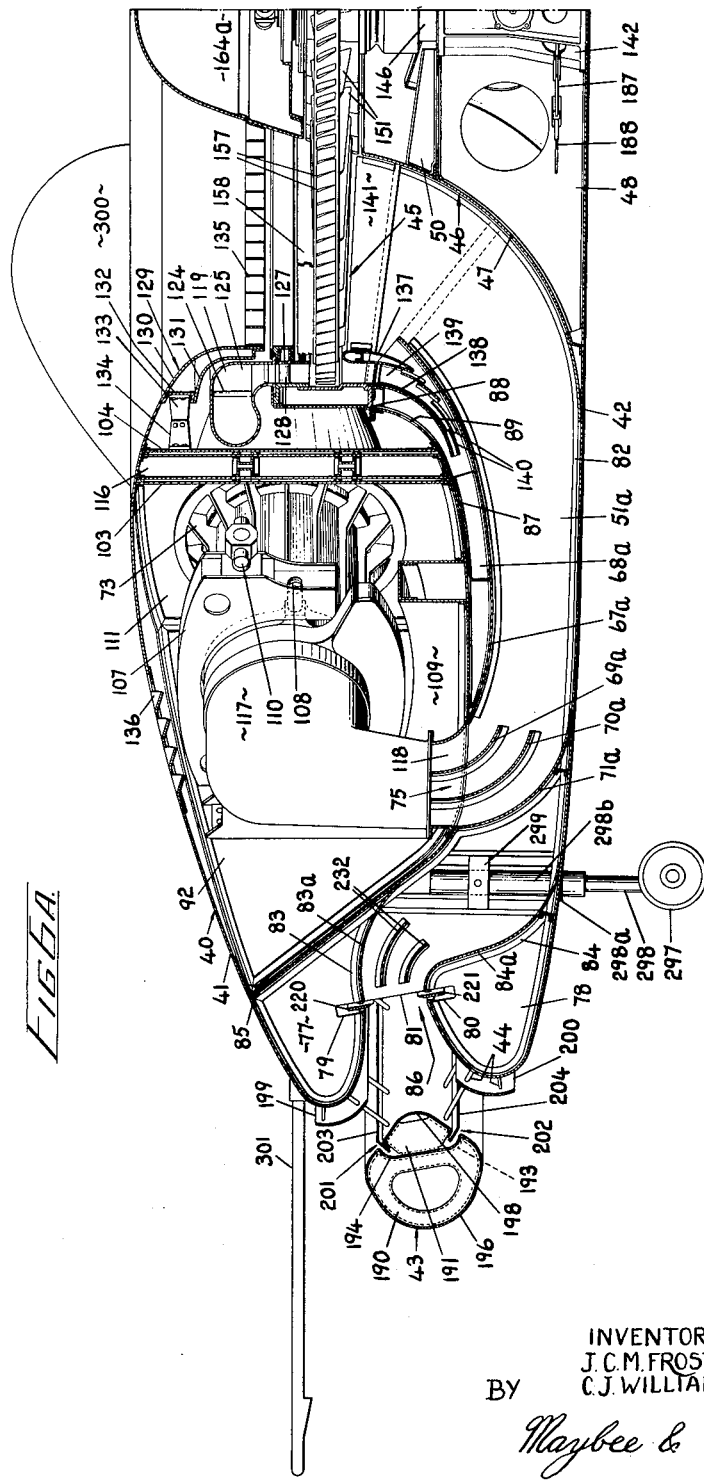
Figure 6B:
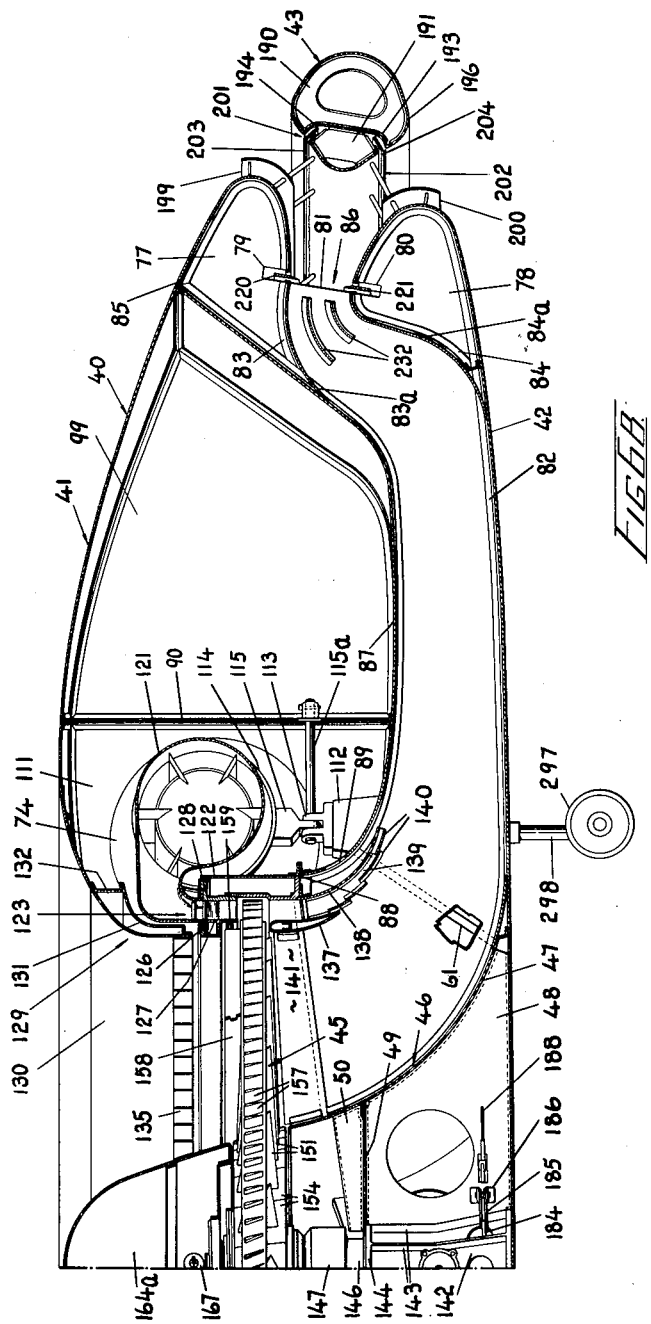
Figure 17:
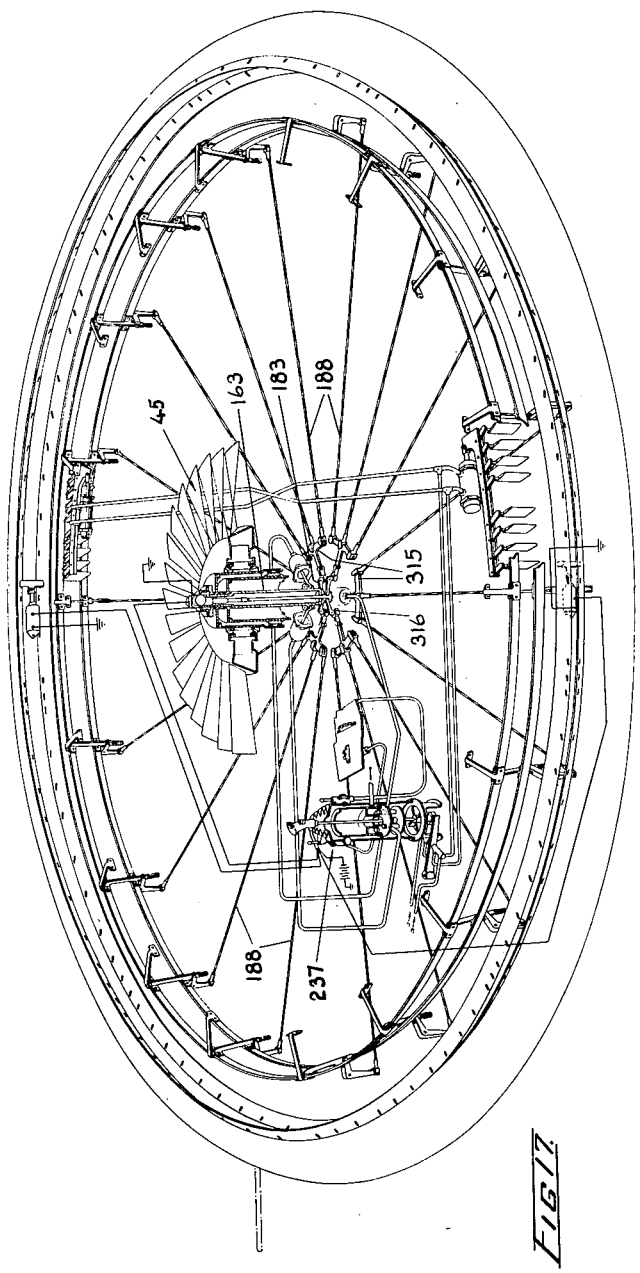
Figure 18A:
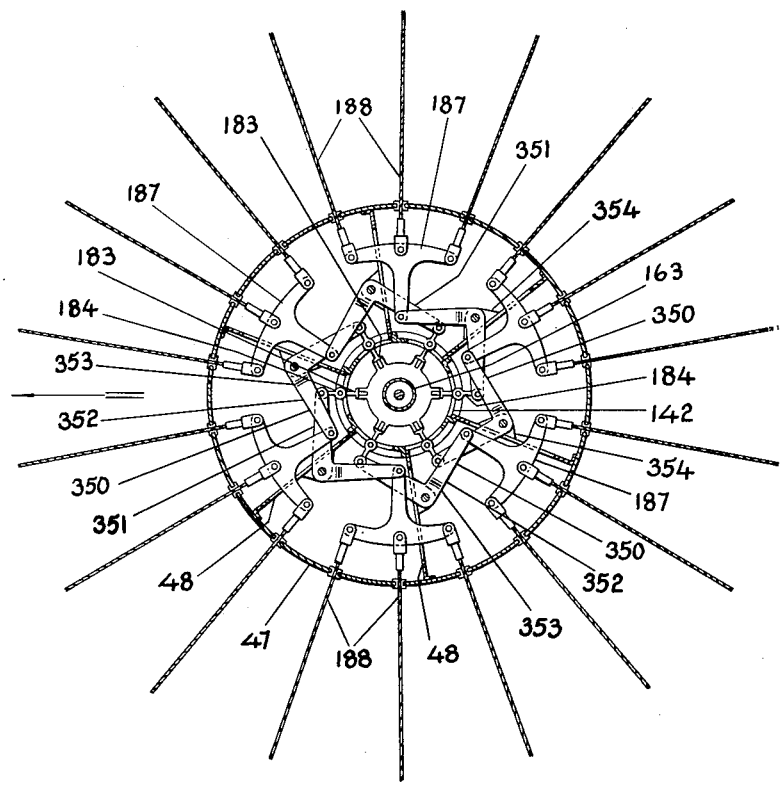
Figure 19:
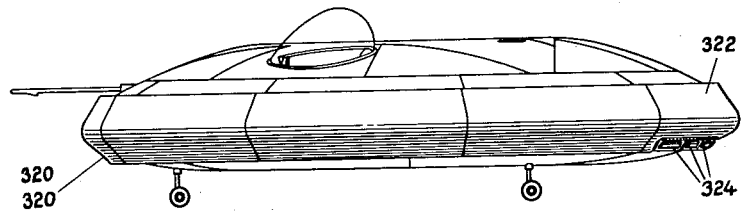
Figure 20:
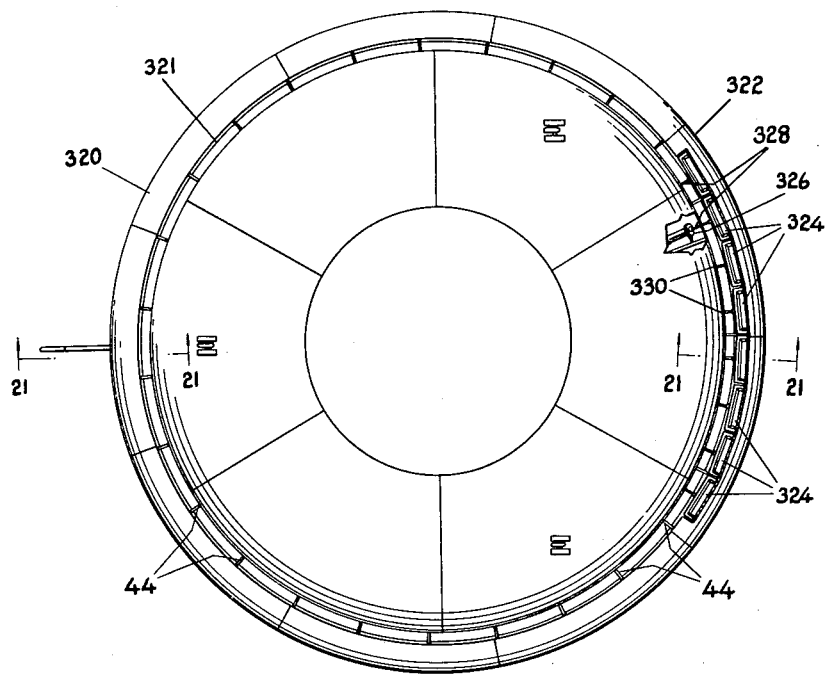
Figure 22:
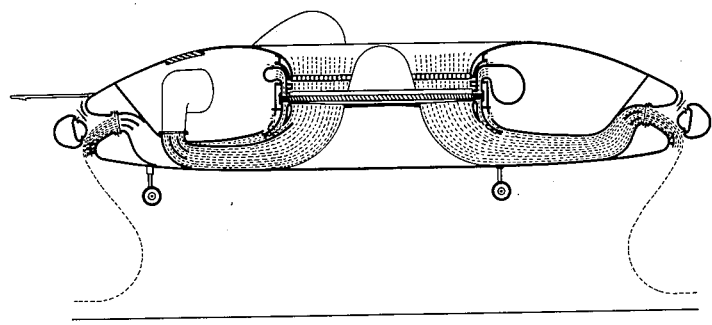
Figure 23:
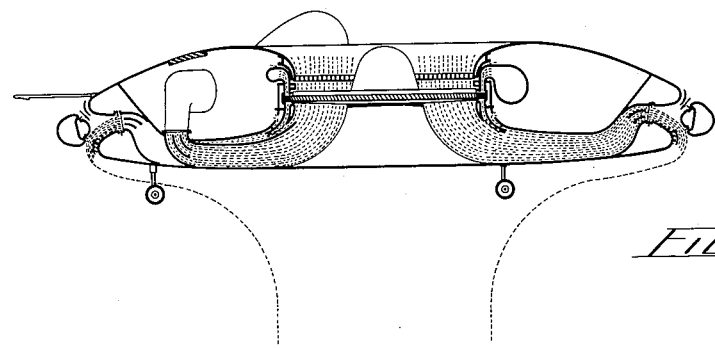
Figure 24:
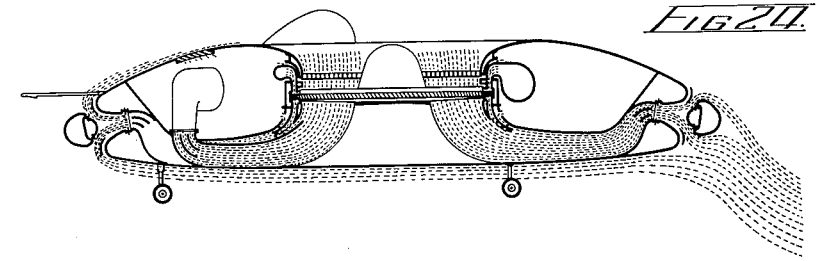
Figure 25:
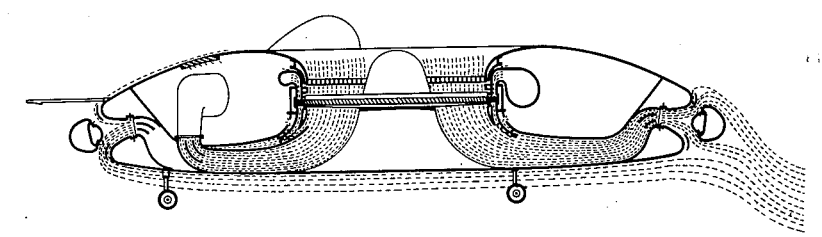
Figure 26:
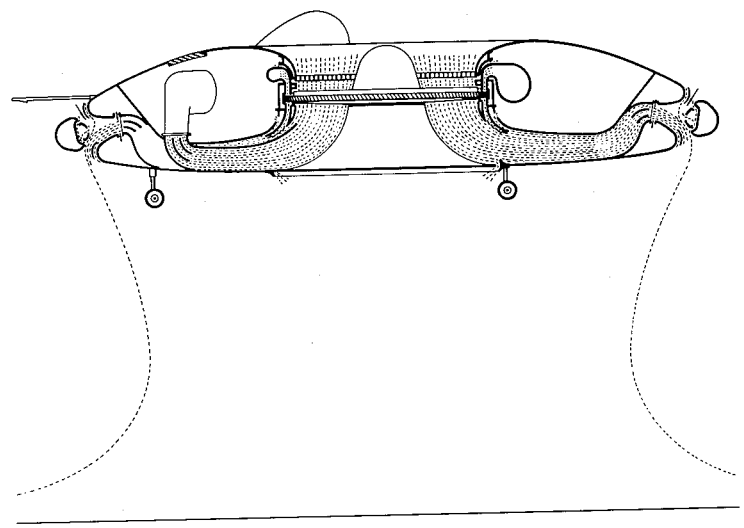
Figure 27:
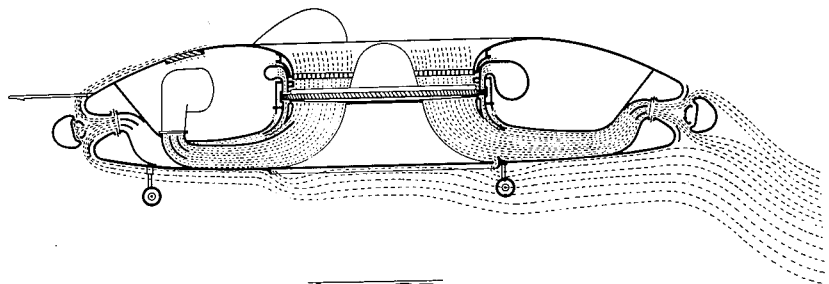
Figure 28:
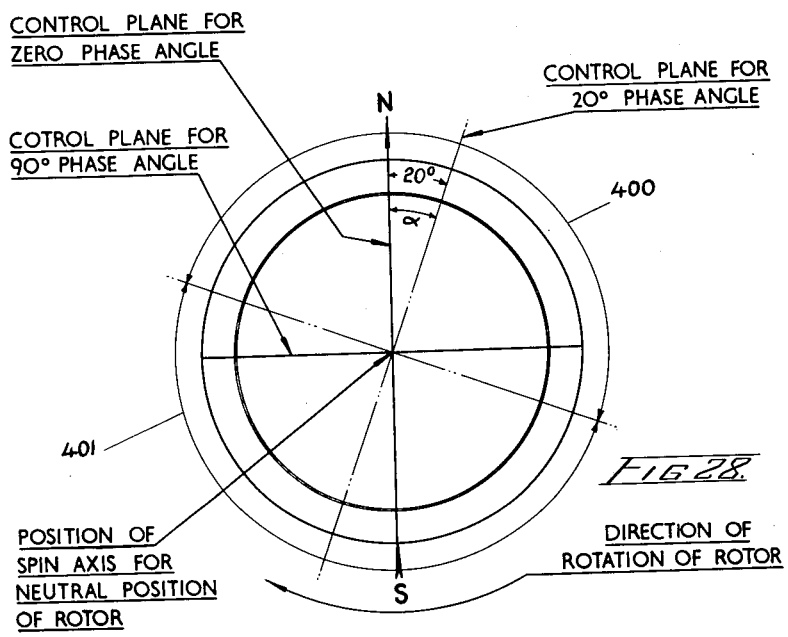
Figure 29:
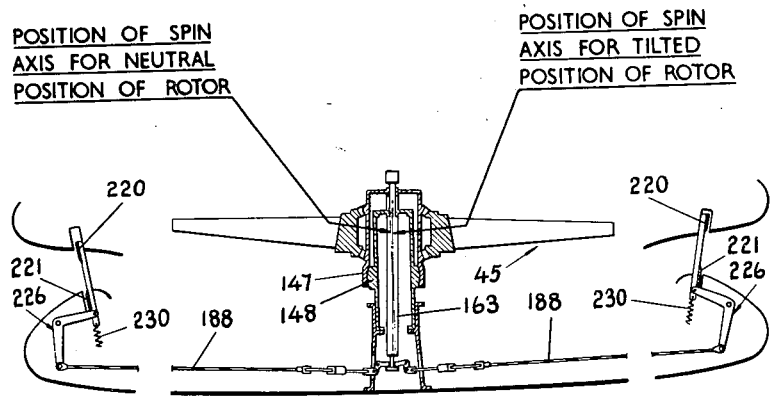
Figure 35:
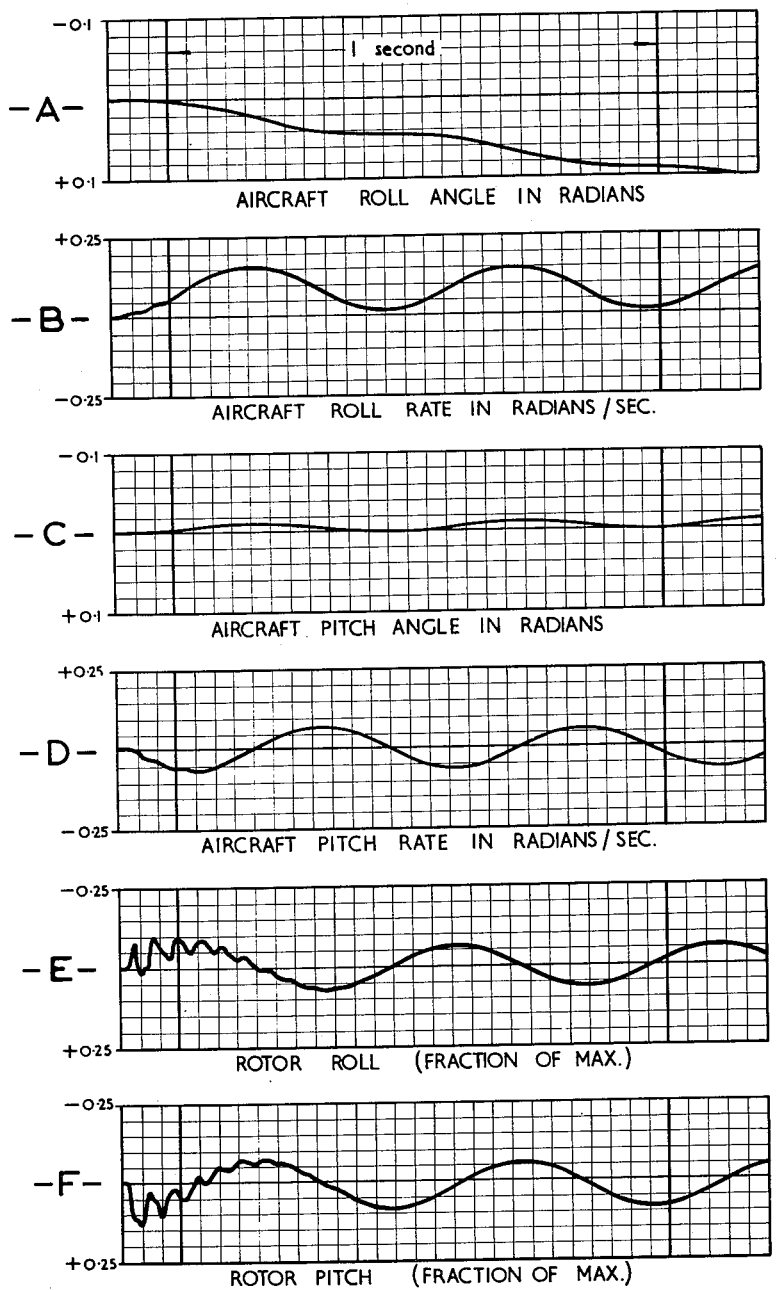
Figure 36:
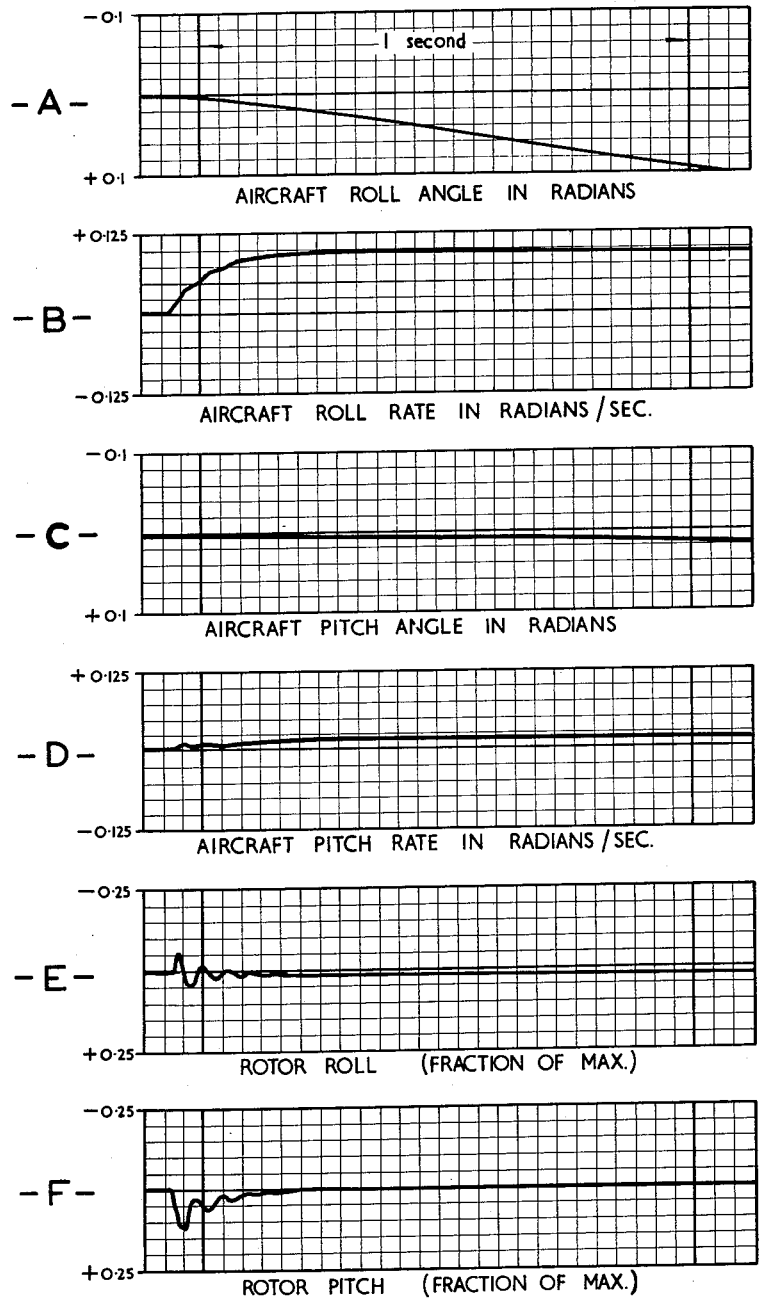

FIGURES 6A and 6B together constitute FIGURE 6 which is a generally longitudinal section of the aircraft on the line 6—6 of FIGURE 3;

FIGURE 7 is a perspective view, partly in section, of the rotor shaft and bearing and also shows part of the aircraft control means;

FIGURE 8 is a detail showing the turbine blades on the outer periphery of the rotor;

FIGURE 9 is a section of the outboard portions of the aircraft taken on the lines 9—9 of FIGURE 3;

FIGURE 10 is a detail showing the means for supporting a baffle on the outboard body structure;

FIGURE 11 shows, in diagrammatic form, the control system of the aircraft;

FIGURE 12 is a perspective view, partly in section, of the pilot's control column which forms part of the control system of FIGURE 11;

FIGURE 13 is a transverse section of the control column of FIGURE 12 taken on the line 13—13 of FIGURE 12;

FIGURE 13A is a diagram showing the correlation between two parts of the control system of FIGURE 11;

FIGURES 14A and 14B together constitute FIGURE 14 which is a generally longitudinal section of an aircraft forming a second embodiment of the invention;

FIGURE 15 is a transverse section, similar to FIGURE 9, of the outboard portions of the aircraft of FIGURE 14;

FIGURE 16 shows in diagrammatic form the control system of the aircraft of FIGURES 14 and 15;

FIGURE 17 shows in diagrammatic form a modified control system for the aircraft of FIGURES 1 to 13;

FIGURE 17A is a perspective view, partly in section, of the rotor shaft and bearing shown in FIGURE 17;

FIGURE 18 is a view similar to FIGURE 17 of a further modified control system for the aircraft of FIGURES 1 to 13;

FIGURE 18A is a detail plan, on a larger scale, of linkage shown in FIGURE 18;

FIGURE 19 is a side elevation of an aircraft constituting a further embodiment of the invention;

FIGURE 20 is an underneath plan of the aircraft of FIGURE 19 partly broken away;

FIGURE 21 is a transverse section, on a larger scale, on the lines 21—21 of FIGURE 20;

FIGURE 22 shows, in diagrammatic form, the gas flow from the aircraft of FIGURES 1 to 13 during take-off;

FIGURE 23 shows, in diagrammatic form, the gas flow from the aircraft of FIGURES 1 to 13 when the aircraft is sufficiently high above the ground to be clear of the "ground cushion" effect;

FIGURE 24 shows, in diagrammatic form, the gas flow from the aircraft of FIGURES 1 to 13 when the aircraft is traveling in forward flight;

FIGURE 25 shows, in diagrammatic form, the gas flow from the aircraft of FIGURES 1 to 13 to produce a "nose-up" couple on the aircraft;

FIGURE 26 shows, in diagrammatic form, the gas flow from the aircraft of FIGURES 14 to 16 during take-off;

FIGURE 27 shows, in diagrammatic form, the gas flow from the aircraft of FIGURES 14 to 16 during forward flight;

FIGURE 28 is a diagram indicating the phase angle relationship between the rotor and the primary gas deflecting means;

FIGURE 29 is a diagram showing the operation of the primary gas deflecting means in response to tilt of the rotor;

FIGURES 30 to 34 are graphs showing the response of the aircraft of FIGURES 1 to 13 to certain control conditions;

FIGURE 35 is a group of graphs showing the response of an aircraft having the control system of FIGURES 17 and 17A to a control condition; and FIGURE 36 is a group of graphs showing the response of an aircraft having the modified control system shown in FIGURES 18 and 18A.

Figure 1:
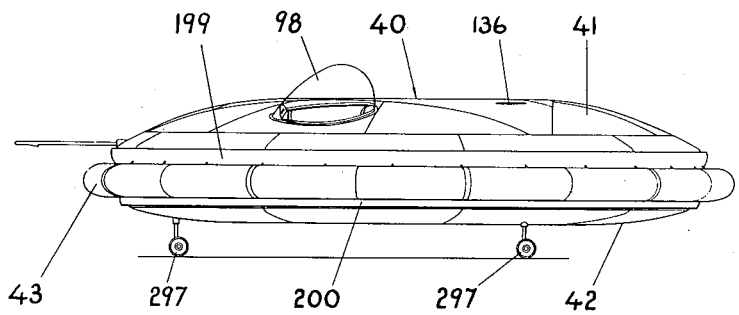
FIGURE 1 is a side elevation of an aircraft according to the invention.
Figure 2:
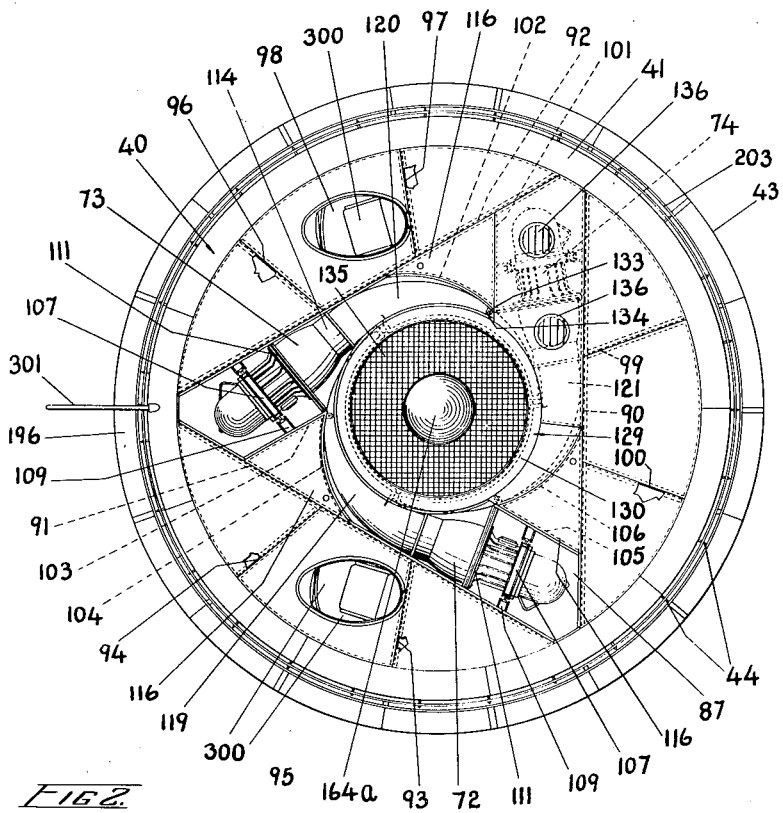
FIGURE 2 is a plan of the aircraft of FIGURE 1 with several panels of the upper aerofoil surface removed to show the locations of the engines.

Referring now to FIGURES 1, 2 and 3, the aircraft there shown comprises an inboard body structure 40, which is generally lentiform and is sheathed by upper and lower skins which provide opposed aerofoil surfaces. The skin providing the upper aerofoil surface is indicated at 41 and the skin providing the lower aerofoil surface is indicated at 42. The upper and lower aerofoil surfaces provide lift developing surfaces. Encompassing the inboard body structure is an outboard body structure 43 generally in the form of a ring or torus. The outboard body structure 43 is supported in juxtaposed spaced relation to the periphery of the inboard body structure 40 by a plurality of spokes 44. Mounted within the inboard body structure is a rotor, indicated generally at 45 in FIGURE 3, which is arranged to rotate about a spin axis which is normal to the chord plane of the aircraft when the rotor is in its "neutral" position parallel to the chord plane of the aircraft. The neutral position of the rotor is a position relative to the body structure of the aircraft; for example, the rotor of the aircraft hereinafter described, when the aircraft is horizontal, is in its neutral position when the rotor is horizontal. Rotation of the rotor impels gas to flow within the aircraft and the gas is discharged from nozzles provided between the inboard and outboard body structures as will hereinafter be described.

Throughout the description, and in the claims, certain terms of positional relationship are used for convenience. The terms "outboard" (or "outboardly") and "inboard" (or "inboardly") denote, respectively, greater and lesser distances from the spin axis of the rotor. The terms "vertical," "upwardly" and "downwardly" denote directions approximately substantially normal to the medial, or chord, plane between the upper and lower aerofoil surfaces.

A system of body axes for the aircraft is also used; in the aircraft shown the yaw axis is the axis of symmetry and is coincident with the spin axis of the rotor when the latter is in its neutral position. The longitudinal axis is the intersection of the plane of symmetry and the chord plane; the lateral axis intersects the longitudinal and yaw axes at right angles.

Referring now to FIGURES 1 to 6, but more particularly to FIGURES 4 to 6, the aircraft is built up over a skeleton consisting of a multiplicity of ribs disposed radially of the yaw axis; in the embodiment to be described there are fifty-four ribs which are attached at their inboard ends to a frusto-conical center post generally indicated at 46. The center post 46 is hollow and has a frusto-conical outer wall 47; the post is strengthened internally by radial and horizontal webs 48 and 49. Further radial webs 50 of channel section reinforce the center post above the horizontal webs 49 but do not extend to the upper edge of the wall 47.

A rib 51 (see FIGURE 4) has an inboard end 52 which extends up the wall 47 to be approximately level with the top of the webs 50; ribs similar to the rib 51 are hereinafter called main ribs. Counting around the aircraft in a clockwise direction from the rib 51, every third rib is a main rib; thus, for example, the rib 53 having an inboard end 54, and the rib 55 having an inboard end 56 are main ribs. Between the ribs 53 and 55 are two short ribs 57 and 58 having inboard ends 59 and 60 respectively which extend to positions similar to that indicated at 61 in FIGURE 6B for the inboard end of a similar short rib in another portion of the aircraft. Except for the ribs adjacent three of the main ribs, there are two short ribs between each pair of main ribs.

One of said three main ribs is rib 51 and on either side of this rib are intermediate ribs 62 and 63 having inboard ends 64 and 65 respectively which extend, as shown in FIGURES 4 and 5, to positions located part way up the frusto-conical wall 47 and intermediate the location of the inboard ends of the short ribs and the location of the inboard ends of the main ribs. The upper edge of each of the ribs 62, 63 is relieved as shown at 66 in FIGURE 4 for the rib 63. This relief extends along the inboard portion of the upper edge of each rib 62, 63 and lowers the inboard portions of the upper edges of these ribs below the upper edge of the rib 51. Between each of the intermediate ribs 62, 63 and the next main ribs on either side of the rib 51 is a short rib similar to the ribs 57, 58 and the relief 66 on the upper edges of the intermediate ribs 62, 63 lowers the inboard portions of said upper edges below the upper edges of the short ribs adjacent to the intermediate ribs. Extending between the relieved portions of the upper edges of the intermediate ribs and the rib 51 there are generally horizontal dividing walls 67. Generally vertical gas deflecting walls 68, see FIGURE 4, are arranged on the upper surfaces of the dividing walls 67 to deflect gas flowing outboardly above the dividing walls 67 into the radial spaces between the intermediate ribs 62, 63 and their adjacent short ribs for a purpose hereinafter to be described. At the outboard termination of the dividing walls 67, is arranged a series of three deflecting vanes 69, 70 and 71 to deflect air from beneath the dividing walls 67 in an upward direction. The deflecting vanes extend on either side of the rib 51 and extend between the ribs 62 and 63. Moreover, the vanes 69 and 70 extend above the upper edges of the ribs 51, 62 and 63 while the vane 71 terminates at the upper edges of the ribs 51, 62, and 63, see FIGURE 4. The ribs 62, 63, the dividing walls 67, the lower aerofoil skin 42 and the vanes 69, 70 and 71 define an air intake for a gas turbine engine as will hereinafter be described.

Referring to FIGURE 2, the aircraft has three gas turbine engines 72, 73 and 74 arranged within the inboard body structure to supply high velocity gas to rotate the rotor 45. The engines are arranged generally tangentially to the periphery of the rotor and are spaced at 120° intervals about the axis of rotation of the rotor. There is an air intake similar to that previously described for each of the engines 72, 73 and 74. The air intake for the engine 73 is indicated generally at 75 in FIGURE 3, the air intake for the engine 74 is indicated generally at 76 in FIGURE 3 and the air intake for the engine 72 is the one shown in FIGURES 4 and 5 and is arranged to the left of the longitudinal axis of the aircraft as a mirror image, as it were, of the air intake 76. The air intake 75 for the engine 73 extends on either side of a main rib 51a lying on the longitudinal axis of the aircraft. If this rib is considered to be the first of the fifty-four ribs forming the skeletal structure of the aircraft then, counting clockwise in FIGURE 3, the air intake 76 extends on either side of the nineteenth rib 51b and the air intake for the gas turbine engine 72 extends on either side of the thirty-seventh rib, i.e. rib 51. Thus the first, the nineteenth and the thirty-seventh ribs, i.e. the ribs 51a, 51b and 51, are the three main ribs referred to above as those about which the rib structure differs from the norm of two short ribs between each main rib.

The air intakes 75 and 76 are similar to the air intake described with reference to FIGURES 4 and 5. The air intakes 75, 76 are arranged about the main ribs 51a and 51b and extend between intermediate ribs 62a, 63a and 62b and 63b respectively. The air intake 75 has dividing walls 67a and deflecting walls 68a similar to the corresponding parts 67 and 68 of the air intake of FIGURES 4 and 5. Similarly the air intake 76 has dividing walls 67b and deflecting walls 68b similar to the corresponding parts 67 and 68 of the air intake of FIGURES 4 and 5.

The air intakes 75 and 76 have deflecting vanes 69a, 70a and 71a, and 69b, 70b and 71b, respectively, similar to the vanes 69, 70 and 71 of the air intake of FIGURES 4 and 5.

The outboard end of each of the fifty-four ribs is similar and is bifurcated to provide upper and lower radiused webs 77 and 78 respectively (see FIGURE 6A). It will be seen that at their outboard ends the ribs increase in depth so that the upper radiused web 77 is above the level of the remainder of the rib. The upper radiused web 77 is provided with a slot 79 in its lower surface and the lower radiused web 78 is provided with a slot 80 in its upper surface opposed to the slot 79. The central portion of the rib terminates in an outboard edge 81 extending between the inboard walls of the slots 79 and 80.

The free edges of the ribs, except for their inboard edges, are furnished with flanges extending normal to the ribs on both sides thereof. These flanges are provided by L-section strips riveted to the ribs adjacent to their edges. Referring to the rib 63 in FIGURE 4 by way of example, one of these L-section strips is indicated at 82. In addition to being provided with these L-section strips round their edges, each rib is provided with two further strips of L-section on each side thereof. Referring again to the rib 63 in FIGURE 4 by way of example, each rib has a flange provided by a strip 83 extending from the lower inboard edge of the slot 79 to the upper edge of the rib as it sweeps upwardly to provide the upper radiused web 77. A strip similar to the strip 83 is provided on each side of each rib. The second further strip 84 is downwardly inclined and extends from the upper inboard edge of the slot 80 to the lower edge of the rib. A strip similar to the strip 84 is provided on each side of each rib. A circumferential strip 85 of L-cross section extends around the aircraft and is connected to the uppermost corners of the ribs.

The structure shown in FIGURE 4 is sheathed as shown in FIGURE 5. The lower aerofoil surface skin 42 is secured to the lower edges of the ribs and is continued upwardly and inboardly around the lower radiused webs 78 to terminate at the outboard edges of the slots 80. The upward and inboard extension of the skin 42 forms the lower surface of an outboardly diverging outlet nozzle indicated generally at 86. In a similar manner a peripheral portion of the upper aerofoil surface skin 41 is connected to the upper surfaces of the upper radiused webs 77 and is continued downwardly and inboardly around the webs 77 to terminate at the outboard edges of the slots 79. The downward and inboard extensions of the skin 41 form the upper surface of the outlet nozzle 86.

The upper edges of the ribs, inboardly of the strip 85, are attached to a sheet metal skin 87. The inboard edge 88 of this skin 87 extends to be level with the inboard edges of the main ribs, to be level, for example, with the inboard edges 52, 54, 56 of the main ribs 51, 53 and 55 mentioned above. The inboard peripheral portion of the skin 87 is provided with a series of circumferentially spaced breather holes 89.

Further sheet metal skins 83a and 84a are secured between the strips 83 and 84 respectively of each adjacent pair of ribs (see FIGURE 5) and define part of the gas displacement passage which terminates in the nozzle 86.

The skin 87 defines a dished space within which are arranged the three gas turbine engines 72, 73, 74, means to lead air from the air intakes to the gas turbine engines, and means to conduct the exhaust gases from the engines to drive the rotor. The dished space is divided into compartments by a series of bulkheads as shown in FIGURE 2. There are three substantially chordal main bulkheads 90, 91 and 92 which define a central, substantially triangular space within which are arranged the engines, the rotor and the fuel tanks. The space to the left of bulkhead 91 is sub-divided by bulkheads 93 and 94 between which is arranged the pilot's cockpit 95. The space to the right of the main bulkhead 92 is sub-divided by bulkheads 96 and 97 between which is arranged the observer's cockpit 98. The space aft of the main bulkhead 90 is subdivided by bulkheads 99 and 100. The compartments between the bulkheads not used for the pilot's and observer's cockpits may be used for cargo or parts of the aircraft control system.

Referring to FIGURE 2 the central, generally triangular space is itself subdivided by three straight dividing walls and three curved dividing walls. There is a straight dividing wall 101 parallel to the bulkhead 90 and a curved dividing wall 102 extending from the inboard end of the wall 101 to the bulkhead 92. Similarly there is a straight dividing wall 103 parallel to the bulkhead 92, and a curved dividing wall 104 extending from the inboard end of the wall 103 to the bulkhead 91. Finally there is a straight dividing wall 105 parallel to the bulkhead 91 and a curved dividing wall 106 extending from the inboard end of the dividing wall 105 to the bulkhead 90.

Each of the engines is mounted in a similar manner which will be described with reference to FIGURES 5 and 6. Referring now to FIGURES 5 and 6A, each engine is supported at its intake end by a yoke 107 which embraces the upper part of the engine and which receives pins 108 secured to the engine frame. The yoke itself is supported from a U-frame 109 forming part of the aircraft structure and extending (in FIGURE 5) between the bulkhead 91 and the dividing wall 105. For the other engines, similar U-frames extend between the bulkhead 92 and the wall 103 and between the bulkhead 90 and the wall 101. The U-frames 109 are of channel section as is clearly shown in FIGURE 6A, and the yokes 107 are supported in the channels of the U-frames by fittings 110. A firewall 111 divides the engine compartment into two parts, and the engine projects through the firewall.

Each engine is supported at its outlet end by means similar to those shown in FIGURE 6B for the engine 74. A pyramidal column 112 is secured to the upper surface of the skin 87 and carries at its upper end a forked lug 113. The engine includes a tailpipe 114 which carries a single lug 115 received in the forked lug 113. The forked lug 113 and the lug 115 have apertures to receive a pin 115a which may be inserted from the compartment which lies to the rear of the bulkhead 90 and to the right of the bulkhead 99. Each engine is mounted in a similar fashion in the positions shown in FIGURE 2. The engines are supplied with fuel from removable fuel tanks 116 located in the spaces between the dividing walls 101, 102; 103, 104; and 105, 106.

Air is fed to the engines from the air intakes previously described and two of which are shown at 75 and 76 in FIGURE 3. Between the intake end of each engine and the skin 87 on the upper edges of the ribs is an elbow 117, the lower end of which is connected to a fitting 118 which in turn is connected to the skin 87. The elbow 117 and the fitting 118 are provided with mating flanges which are bolted together; each pair of vanes 69 and 70, as shown in FIGURE 6A, projects to the top of the fitting 118.

The exhaust gases of the engines are fed into a common ring manifold and are arranged to drive the rotor. Associated with each engine, and connected to the outlet end thereof, is a curved converging manifold somewhat in the shape of a tusk (see FIGURES 2 and 4). The manifold for the engine 72 is indicated at 119, the manifold for the engine 73 is indicated at 120 and the manifold for the engine 74 is indicated at 121. The manifolds are connected to the upper edge of a box-section ring member 122 against the lower edge of which abuts the inboard edge 88 of the skin 87. The relative orientation of the narrow end of one tusk manifold and the wide end of an adjacent manifold is shown clearly for the manifolds 119 and 121 in FIGURE 4. The manifolds have a downwardly opening circumferential slot 123 through which the propulsive gases generated by the gas turbine engines are discharged downwardly adjacent to the inboard surface of the ring member 122. Spacer rods 124 and 125 are arranged within the manifolds to preserve their shape. The inboard peripheries of the manifolds are flanged as indicated at 126 in FIGURE 4 and secured to the underside of this flange 126 is a further ring member 127. Guide vanes 128 are interposed between the ring members 122 and 127 and serve as inlet guide vanes for the tip turbine of the rotor hereinafter to be described.

Supported from the inboard junctions of the dividing walls 101, 102; 103, 104; and 105, 106, is an inlet guide ring 129 for the rotor. This guide ring is clearly shown in FIGURES 5 and 6A and comprises inboard and outboard curved metal skins 130 and 131 joined and spaced at their upper ends by a channel member 132. The channel member has secured to its outboard periphery three lugs 133 spaced at 120° intervals; the lugs are secured between spaced double lugs 134 which are in turn secured to the dividing walls 102, 104, and 106 at the inboard ends thereof. The lower edge of the outboard skin 131 is flanged inboardly and is spaced above the flange 126 of the tusk manifolds while the inboard skin 130 extends downwardly towards the ring member 127 and is secured to a flange provided at the lower edge of the outboard skin 131. The guide ring 129 is spaced from the "tusk" manifolds so that cooling air may flow over the manifolds and between the ring member 127 and the lower edges of the skins 130, 131.

The outer skin 130 of the guide ring is faired into the upper aerofoil surface skin 41 of the aircraft which is divided into panels, the joints between the panels being arranged to lie over the bulkheads, and the panels being removable for access to the engines and to the compartments between the bulkheads. The guide ring 129 carries a cellular grating 135 positioned above the rotor 45 while the panels over the engine compartments are provided with breather louvres 136 which admit air to cool the engine compartments.

After the exhaust gases from the gas turbine engines have passed into the tusk manifolds and downwardly through the guide vanes 128 they drive a tip turbine that constitutes part of the rotor, as will hereinafter be described, and after passing through the tip turbine the gases enter exhaust boxes and are discharged into the gas displacement passage; the exhaust boxes are designed to provide a uniform pressure gradient in the exhaust gases as they drop in pressure upon entering the gas displacement passage. Except over the air intakes to the engines, the arrangement of the exhaust boxes is as follows and will be described with reference to FIGURE 6B. Each exhaust box extends between an adjacent pair of main ribs and has an inboard guide vane 137, a curved outboard wall 138, and side walls 139. The guide vane 137 is continued downwardly by corrugated strips 140 which are arranged partially to overlap one another. The corrugated strips are arranged so that gas may pass from between the guide vane 137 and the wall 138, then between the corrugations in the strips 140 and out of the exhaust box. The outboard edges of the wall 138 and of the outboard corrugated strip 140 are slotted to accommodate the inboard edges 61 of the short ribs between each adjacent pair of main ribs. Each main rib is provided at its inboard edge with a curved aerofoil section guide vane 141 extending between the upper end of the frusto-conical wall 47 and the upper end of an adjacent guide vane 137 on an exhaust box. The upper end of the curved wall 138 of each exhaust box abuts against the lower edge of the ring member 122. The flow of air through the sectors of the gas displacement passage induces air to flow from the engine compartments through the holes 89 in the skin 87 and over the curved walls 138, thereby serving partially to cool the exhaust boxes.

The arrangement of the exhaust boxes over the air intakes of the engines is slightly different and will be described with reference to FIGURES 5 and 6A. All the exhaust boxes are similar to that previously described with reference to FIGURE 6B but it will be seen by reference to FIGURES 5 and 6A that the exhaust boxes over the air intakes discharge between the dividing walls 67 and the metal skin 87. The exhaust gas passing between the walls 67 and the skin 87 is deflected by the gas deflecting walls 68 into the sectors of the gas displacement passage lying between the intermediate ribs, such as 62, 63, and their adjacent short ribs.

The construction of the rotor and rotor shaft will now be described with reference to FIGURES 4 to 8. Centrally located in the center post structure 46 is a base casting 142 having radial flanges 143, to which the radial webs 48 are secured, and having an upper horizontal flange 144 to which the horizontal webs 49 are secured. Referring now to FIGURE 7, the base casting 142 is provided with an internal flange 145 and telescoped within the base casting and resting on, and secured to, the flange 145 is a hollow vertical shaft 146 which extends upwardly beyond the base casting 142. Surrounding the upper portion of the vertical shaft 146 is a sleeve 147; a part spherical bearing 148 is interposed between the shaft 146 and the lower portion of the sleeve 147.

The rotor 45 is rotatably mounted at the upper portion of the sleeve 147 by opposed thrust races 149 and rotates about a spin axis which, when the rotor is in its neutral position, is parallel to the yaw axis or axis of symmetry, of the aircraft. The rotor includes an inner ring 150 of E-section, the arms of the E facing outboardly and the center arm being bifurcated. Impeller blades 151 are secured at their roots or inner ends to blocks 152, also of E-section, which face inboardly, the central arms of the blocks 152 being received between the arms of the bifurcated central arm of the member 150. The blades 151 are secured to the blocks 152 by being welded to plates 153 forming part of the blocks 152. The rotor also includes a segmented inner shroud 154, the inboard ends of which lie against the upper and lower surfaces of the inner ring 150 of the rotor. The members 150, 152 and the shroud 154 are connected together by bolts 155, each bolt having enlarged shoulders extending through the arms of the E-section members to provide bearing surfaces. The outboard ends of the impeller blades 151 are secured to an outer segmental ring member 156, see FIGURE 8, and secured to the outboard surface of the ring 156 is a plurality of turbine blades 157. Secured to the upper surface of the ring 156 is an element 158 of a labyrinth seal which co-operates with an opposed labyrinth element 159 on the inboard surface of the ring member 127.

Returning now to FIGURE 7, the upper end of the vertical shaft 146 is closed by a flexible diaphragm 160 and the top of the sleeve 147 is closed by a flexible diaphragm 161. A sleeve 162 is held between central portions of the diaphragms 160 and 161; passing through the sleeve and central apertures in both diaphragms is a hollow control shaft 163 which extends downwardly to adjacent to the lower end of the base casting 142. The sleeve 162 and the central portions of the diaphragms are clamped between a shoulder 163a on the control shaft and a flanged ring nut 165 threaded to the upper end of the control shaft 163. Secured to the diaphragm 161 is a plate 164, to which a domed intake cone 164a is secured, see FIGURE 6.

Secured to the flanged nut 165 is an electric linear actuator 166. The actuator is provided with a depending shaft 167 extending within the control shaft 163 and the lower end of the shaft 167 is provided with a forked end 168. A rod 169 is connected at its upper end to the forked end 168 by a pin 170 and the lower end of the rod 169 is provided with a detachable mushroom head 171. The lower end 169 of the rod passes through an aperture in an otherwise solid end piece 172 of the shaft 163.

Spaced at 120° intervals around the circumference of the lower portion of the control shaft 163 are three bifurcated lugs, two of which are shown at 173 and 174. Pivotally attached to each bifurcated lug is the ram of a pneumatic bellows actuator fixed to the base casting 142. Thus the ram 175 of an actuator 176 is attached to the lug 173. Similarly, the ram 177 of a bellows actuator 178 is attached to the lug 174 and a third bellows actuator 179 is connected by its ram to the third lug on the control shaft. Each of the actuators contains a bellows similar to that indicated at 180 for the actuator 176 and is operated by pneumatic pressure as will hereinafter be described.

Due to the resilience of the material of which they are made, the bellows act as springs and the combined effect of the springiness of the bellows is to tend to hold the control shaft 163 central within the vertical shaft 146 and thereby hold the rotor in its neutral position.

The lower end of the control shaft 163 is provided with an outboardly directed flange 181 which carries, equally spaced around its outboard periphery, six bifurcated lugs, one of which is indicated at 182. Pivotally mounted between each lug 182 is a bell-crank lever, two of said levers being indicated at 183; each lever has an inboard end which bears on the upper surface of the mushroom head 171 of the control rod 169. It will be seen that vertical movement of the control rod will pivot the bell-cranks in their supporting lugs. Pivotally secured to the other end of each bell crank 183 is a hinged link 184, and the outboard ends of the links 184 are pivotally attached to further links 185 intermediate the ends of the links 185. One end of each of the links 185 is pivotally attached to a lug 186 carried by a radial web 48 as is best shown in FIGURES 3 and 7. Pivotally connected to the other end of each of the links 185 is a T-piece 187 to which the inboard ends of three cables 188 are attached, the points of attachment of the cables being equally spaced along the outboard edge of the T-piece. Where necessary, the radial ribs 48 are slotted as indicated at 189 to permit passage of the T-pieces. The outboard ends of the cables 188 are connected to primary gas deflecting means hereinafter to be described. It will be seen that opposed cables are interconnected by being connected to the control shaft 163.

Referring to FIGURES 4, 5, 6 and 9, the outboard body structure will now be described. It will be recalled that the outboard body structure 43 is supported from the inboard body structure 40 by means of spokes 44 and that it is in the form of a ring or torus made up of a plurality of sections. The outboard body is fabricated in a manner similar to the manner of fabrication of the inboard body, i.e. it consists of formers covered with sheet metal. The formers of the outboard body are of two types, namely a plurality of outboard formers 190 and a plurality of inboard formers 191. Each of the outboard formers 190 is generally triangular with a rounded apex and has a central aperture 192. The base of each former 190 is cut away and is provided with flanges 193 (see FIGURE 4) to which are secured an annular channel member 194 to the inboard periphery of which the formers 191 are secured.

The spokes 44 are secured at their inboard ends to the outboard ends of each alternate rib of the inboard body structure. At their outboard ends the spokes are secured between two formers 191 arranged close together with a block between them to receive the outboard end of the spoke. Such a pair of formers is indicated at 195 in FIGURE 4.

The edges of each former 190 are flanged and to these flanges is secured a sheet metal covering 196 which extends inboardly to terminate at the edges of the channel member 194 as is best shown in FIGURES 6 and 9. The inboard peripheries of the formers 191 are each provided with a pair of inclined flanges 197, and secured to these flanges is a sheet metal covering 198 which provides the inboard periphery of the outboard body structure.

An upper circumferential guide vane 199 is supported on the spokes 44 which extend between the upper periphery of the outboard body and the inboard body; a lower circumferential guide vane 200 is supported on the spokes 44 which extend between the lower periphery of the outboard body and the inboard body. The guide vane 199 is located in an upper peripheral nozzle provided between the outboard body and the inboard body, and the guide vane 200 is located in a lower peripheral nozzle provided between the outboard body and the inboard body. The divergent outlet nozzle 86 communicates with both upper and lower peripheral nozzles.

As is clearly shown in FIGURES 9 and 10, slots are provided between the inboard ends of the covering 196 of the formers 190 and the outboard ends of the covering 198 of the formers 191. There is thus provided an upper peripheral slot 201 and a lower peripheral slot 202 in which are mounted secondary gas deflecting means in the form of baffles which may be operated to control the direction in which the propulsive gas leaves the upper and lower peripheral nozzles. The baffle in the upper slot 201 is indicated at 203 and the baffle in the lower slot at 204. The baffles are formed of strip metal fashioned into the shape of frusta of a circular cone and are mounted in the outboard body by the arrangement shown in FIGURES 9 and 10. Secured to the base portion of suitably spaced formers 190 are flanged fittings 205 having spring anchoring flanges 206 and 207 which are, respectively, generally perpendicular to the baffles 203, 204. A tension spring 208 extends between the flange 206 and the baffle 203 and a tension spring 209 extends between the baffle 204 and the flange 207. The baffles are mounted to slide on the outboard body as better shown in FIGURE 10 for the baffle 203. The baffle is slotted as indicated at 210 and the slot embraces a sleeve 211 secured to a flange 212 by means of a nut and bolt assembly 213; the baffle is guided on the sleeve by spacers 214 and 215.

Referring to FIGURES 3, 4 and 11, the baffles are operated by actuators 216 at opposite ends of the lateral axis of the aircraft. From FIGURE 11 it will be seen that the slots 210 of the baffles 203, 204 are arranged to be parallel to the longitudinal axis of the aircraft and therefore lie at different angles to the vertical at differing points round the periphery of the aircraft. Thus, adjacent to the lateral axis of the aircraft and in the vicinity of the actuators 216, the slots are substantially horizontal while adjacent to the longitudinal axis of the aircraft the slots are viewed in elevation, substantially vertical.

The resulting support of the baffles is analogous to the support of the base of a hollow cone on a sphere of a diameter somewhat larger than the base of the cone. If the apex of the cone is moved in two directions in a given vertical plane then the base of the cone in that plane will move vertically relative to the sphere while the portions of the base of the cone in a vertical plane containing the apex and normal to the plane of movement of the apex of the cone will not be vertically displaced relative to the sphere. By moving points on the baffles 203, 204 backwardly and forwardly adjacent to the ends of the lateral axis of the aircraft it is possible to control the extent of projection of the baffles into the upper and the lower peripheral nozzles. Referring now to FIGURE 4, adjacent to the actuators 216, the baffles 203, 204 are secured together by a strap 217. One end of the actuator 216 is pivotally secured at 218 to a pair of formers 191 and the ram of the actuator is secured at 219 to the strap 217. The other actuator is arranged in a similar fashion and operation of the actuators will rock the baffles as described above. The baffles 203, 204 constitute secondary gas deflecting means.

Primary gas deflecting means are arranged in the slots 79 and 80 in the upper and lower radiused webs 77 and 78 at the outboard ends of the ribs of the inboard body and include an upper baffle 220 and a lower baffle 221, each baffle being formed as a frustum of a hollow cylinder. The edges of the baffles which project into the gas displacement passage have sharp edges as indicated at 222. At spaced intervals around the periphery of the aircraft the upper baffle 220 is supported by resilient strips 223 which are secured to the sheet metal skin 87 at their inboard ends by flanges 224 (see FIGURES 9 and 11). At spaced positions in register with the resilient strips 223, the baffles 220, 221 are connected together by straps 225. The lower end of each strap 225 is secured to the upper arm 226a of a bell-crank 226 having a second arm 226b and which is pivoted at 227 between a pair of supporting ribs 228. The location of the supporting ribs is clear from FIGURE 3; they are interposed between the outboard ends of two adjacent ribs of the inboard body structure. The outboard ends of the cables 188, which were described with reference to FIGURE 7, are connected to the lower ends of the arms 226b of the bell-cranks. A bracket 229 is secured between the lower portions of the supporting ribs 228 and a tension spring 230 is interposed between the lower end of each strap 225 and a lug 231 on each bracket 229. It will be seen that the springs 230 tend to pull the baffles 220, 221 into their lowermost positions so that the baffle 220 projects into the gas displacement passage and the baffle 221 is retracted into the slot 80. Guide vanes 232 are provided at the outboard end of the displacement passage to guide the outboardly flowing propulsive gas into the outboardly divergent outlet nozzle 86.

Referring now to FIGURES 3, 4, 5 and 11, the aircraft is provided with two sets of pivotally mounted rudder vanes in the gas displacement passage adjacent to the outlet nozzle. Each set of vanes comprises eight individual vanes indicated at 233, the vanes being arranged in two groups of four, each group being arranged between two adjacent ribs of the inboard body structure. The upper ends of each group of vanes are connected by short links to a main link 234 which is in turn connected to the ram 235 of an actuator 236. The actuators are pivotally mounted on ribs of the inboard body structure and include springs tending to center the rudder vanes in radial positions. Operation of the actuators 236 pivots the vanes 233 to control the directions in which the propulsive gas leaves the two sectors of the gas displacement passage in which the vanes are mounted. The rudder vanes are mounted on corresponding positions on each side of the longitudinal axis of the aircraft, the vanes being arranged just aft of the lateral axis of the aircraft.

The baffles in the outboard body structure (the secondary gas deflecting means), the baffles in the inboard body structure (the primary gas deflecting means) and the rudder vanes are all controlled from a control column indicated generally at 237 in FIGURE 11 and shown in detail in FIGURES 12 and 13 to which reference is now made. The control column is, of course, under the control of the pilot and is situated in the pilot's cockpit 95. The floor of the cockpit is indicated at 238 and the control column is partly encased in a shroud 239 upstanding from the floor 238. The control column itself comprises an upper sleeve 240 which extends above the shroud 239 and is secured at its lower end to a lower sleeve 241, the lower end of the lower sleeve being secured to the floor 238. Mounted within the upper sleeve 240 is an outer gimbal ring 242 and an inner gimbal ring 243, these gimbal rings being shown clearly in FIGURE 13. The inner gimbal ring is supported from the outer gimbal ring on axes 244; supported within the inner gimbal ring by axes 245 is a double-walled sleeve 246. The space between the double walls of the sleeve 246 provides a plenum chamber 247 which is supplied with high pressure air through a conduit 248 which is connected to a union in the outer wall of the double sleeve and passes through a slot 249 in the upper sleeve 240. Secured in a disc 250 closing the lower end of the double sleeve are three Venturi nozzles 251a, 251b and 251c. The three nozzles are spaced around the axis of the sleeve at 120° intervals and each nozzle has an inner stack pipe 252 which opens at its upper end into the plenum chamber 247. The outer casing of the nozzle surrounds the inner stack pipe 252 and is of greater cross sectional area than the inner stack pipe. Conduits 253 are connected at their one ends to the outer casings of the nozzles above the lower ends of the inner stack pipes. The other ends of the conduits are connected to the actuators 176, 178 and 179 as shown in FIGURES 11 and 13A.

Reverting to FIGURE 12, the lower sleeve 241 carries a bearing 254 adjacent its upper end, the bearing being supported by webs 255. Rotatably mounted in the bearing is a resilient rod 256 which projects both upwardly and downwardly from the bearing. The rod is surmounted by a handle 257, and a flexible bellows 258 connects the upper end of the upper sleeve 240 to the lower end of the handle 257. At its lower end the rod carries a cam 259 which co-acts with a tongue 260 which is pivoted at 261 to a base plate 262. Adjustable spring plungers 263, 264 and 265 act on the tongue and cam to bias the former in a central position and an adjustable stop 266 is provided to limit movement of the plunger 265 in one direction and to provide an adjustable datum for the cam. Mounted in upstanding lugs 267 on the base plate 262 are opposed Venturi nozzles 268. The construction of each of these nozzles is similar to the nozzles 251 described above. Thus high pressure air is fed into the nozzles through conduits 269 and the pressures in the outer casings of the nozzles are communicated through the conduits 270 which are connected to the rudder actuators 236 as shown in FIGURE 11.

Above the bearing 254, the rod 256 carries a circular plate 271; a compression spring 272 is interposed between the disc 250, which seals the bottom of the double-walled sleeve 246, and the plate 271. The double-walled sleeve 246 is continued upwardly by a hollow sleeve 273 which co-acts with eccentric cam wheels 274 and 275. The cam wheel 274 is housed in a bearing 276 supported on the outer surface of the upper sleeve 240, and the cam wheel 275 is supported in a similar bearing 277. The cam wheels project through slots 278 in the upper sleeve 240, and the sleeve 273 is kept in contact with the cam wheels by leaf springs 279.

The cam wheels are operated by remote control from hand wheels 280 and 281, which are arranged at right angles to one another in the pilot's cockpit and within convenient reach of the pilot. A flexible cable control connects the hand wheels to the cams and is similar for each hand wheel and cam. The hand wheel 280 is provided with a sleeve bearing 282 which is supported by a flange 283. The hand wheel also carries a threaded shaft 284 which is received within an internally threaded bore of a slidable block 285. The slidable block is connected to one end of an inner flexible cable 286, the outer part of the cable, indicated at 287, being anchored at 288. The other end of the outer cable 287 is anchored to the sleeve 240 by a fitting 289 which is slotted at 290 to expose the inner cable 286. The inner cable is wire wound to produce the effect of a worm and it meshes with a worm wheel 291 carried in the bearing 276, the worm wheel being connected to the cam wheel 274. Rotation of the hand wheel 280 moves the inner cable 286 within the outer cable 287 thereby rotating the worm wheel 291 and the cam wheel 274. In a similar manner, rotation of the hand wheel 281 rotates the cam wheel 275. By rotating the hand wheels 280 and 281 fine adjustment of the position of the double-walled sleeve 246 in its gimbal mounting can be obtained since the wheels 274 and 275 are at right angles to each other.

The control column includes two spring loaded push switches 292 and 293 which are connected by leads 294 to the actuator 166 situated at the top of the rotor shaft. As long as pressure is applied to the button 292 the actuator 166 will be caused to lift the rod 169. Conversely, pressure on the button 293 will cause the actuator to lower the rod 169 but, as soon as the pressure is released from the button, the rod will cease to move. The control column also carries a switch 295 connected to the actuators 216 by leads 296. Operation of the switch 295 operates the actuators 216 to move the baffles 203, 204 in the outboard body.

Referring to FIGURES 1 and 6, the aircraft is provided with a tricycle undercarriage consisting of castors 297 supported by legs 298. Each leg has a lower flange 298a secured to the lower skin 42 and a cylindrical casing 298b secured to a main rib by an upper mounting 299. Transparent canopies 300 extend over the pilot's and observer's cockpits and a pilot head boom 301 extends from the forward part of the aircraft.

FIGURES 14, 15 and 16 show a modification of the aircraft described with reference to FIGURES 1 to 13. The construction of the inboard body structure of the modified form of aircraft is identical, except in one respect, to that described with reference to FIGURES 1 to 13. One of the modifications incorporated in the second aircraft concerns the secondary gas deflecting means incorporated in the outboard body structure.

Basically the main structure of the outboard body structure shown in FIGURES 14 and 15 is the same as has heretofore been described. Thus there is a series of outboard formers 190 of the same shape as hereinbefore described, and the formers are covered with sheet metal 196 which extends inboardly to the inboard edges of the channel member 194. Also, there is a plurality of inboard formers 191, which are covered with sheet metal 197. The outboard edges of the covering 197 are spaced from the inboard edges of the covering 196 as before to provide upper and lower slots 201 and 202. However, in this modified construction, there are no baffles mounted in the slots 201, 202 and no actuators for the baffles. Instead of the baffles, the inboard periphery of the outboard body structure is provided with a plurality of gas entry ports 302 equally spaced around the whole of the inboard periphery. There is a circumferential space 303 between the inboard portion of the covering 197 and the inboard edges of the formers 191 which are cut away at 304. Movable in the space 303 in a portion of the outboard body structure adjacent to the rear of the aircraft is obturator means comprising a slide 305 operated by actuators 306.

As shown in FIGURE 16, there are three actuators 306 which are pivotally mounted to the outboard body structure and are spaced along the slide 305 which is curved to conform with the curvature of the outboard body structure. Each actuator 306 has a ram 307 which is pivotally mounted between a pair of links 308 which in turn are pivotally mounted about an axis 309 on the outboard body structure. The inboard ends of the links 308 are secured to the slide 305 which is provided with a plurality of apertures 310 which are spaced apart by distances equal to the distances between the gas entry ports 302 in the covering 197. The slide 305 may be moved by the actuators 306 so that the apertures 310 in the slide register with the gas entry ports 302 in the covering 197 or the slide may be moved to a position in which it closes the gas entry ports in the rear portion of the outboard body structure. When the apertures 310 are in register with the gas entry ports 302 propulsive gas enters the gas entry ports, is redirected by the channel member 194, and is ejected through the slots 201 and 202. The actuators 306 are operated from the pilot's control column 237 through the switch 295, described with reference to FIGURE 12, and which is connected to the actuators by leads 311. The control system of the modified aircraft is otherwise identical with the control system described for the first embodiment of the aircraft.

The modification to the inboard body structure comprises a downwardly directed, annularly arranged, stabilizing nozzle in the lower aerofoil skin 42 of the aircraft. Referring to FIGURE 14B, an inner lip 312 is provided to deflect some of the gas flowing through the gas displacement passage to a nozzle slot 313 in the skin 42. The lip extends between each pair of adjacent ribs of the inboard body structure, however, the lip 312 and the slot 313 are interrupted between the ribs which define the air intake passages for the engines. Thus reference to FIGURE 14A will show that there is no slot 313 or inner lip 312 in the air intakes for the engine 73. An outer lip 314 is provided to direct gas passing through the slot 313 slightly inboardly. The lip 314 is continuous and is not interrupted under the air intakes. Some of the propulsive gas flowing through the gas displacement passage will be deflected by the lip 312 to pass through the downwardly directed stabilizing nozzle 313 for a purpose which will hereinafter be described.

FIGURES 17 and 17A show a somewhat modified control system for the aircraft shown in FIGURES 1 to 13. Structurally, the modification amounts to the omission of the links 184, 185 described with reference to FIGURE 7. In FIGURES 17 and 17A, the inboard ends of the cables 188 are connected in groups of three to T-pieces 315 and the inboard ends of the T-pieces are connected directly through clevises 316 to the lower ends of the bell-cranks 183. The effect of this modified construction on the response of the aircraft will be described hereinafter but it will be seen that if the lower end of the control shaft moves in a given direction the cables 188 lying in that direction will be moved outboardly and opposed cables will be moved inboardly. In all other respects the control system shown in FIGURES 17 and 17A is the same as that described with reference to the aircraft of FIGURES 1 to 13.

FIGURES 18 and 18A show a modified form of control system in which right angled pivoted links, or bell-cranks 350, are interposed between the links 184 and the T-pieces 187 to which the inboard ends of the cables 188 are connected. Each bell-crank has two arms, one arm 351 being pivotally attached at its free end to a link 184 and the other arm 352 being cranked upwardly at 353 to clear the arm 351 of an adjacent bell-crank 350. Each of the bell-cranks 350 is pivotally mounted in a lug 354 secured to one of the radial webs 48 which extends between the inner surface of the wall 47 and the base casting 142.

It will be apparent that the arrangement is such that if the control shaft 163 moves in a given direction, instead of the cables 188 lying in that direction being moved outboardly, cables 188 lying at 90° clockwise from that direction will be moved outboardly and opposed cables will be moved inboardly. The effect of this arrangement on the response of the aircraft will be described hereinafter but in all other respects the control system shown in FIGURES 18 and 18A is the same as that described with reference to the aircraft of FIGURES 1 to 13.

Referring now to FIGURES 19, 20 and 21, the embodiment of the invention there shown differs from the embodiment of the invention shown in FIGURES 1 to 13 in the construction of the outboard body structure and in the arrangement of the secondary gas deflecting means.

Referring to FIGURE 21, the outboard body structure is fabricated from a series of radially arranged formers covered with sheet metal covering in a manner similar to that described in the other embodiments of the invention although the formers providing the skeleton of the outer body structure are somewhat different in shape from those previously described. The formers providing the skeleton of the forward portion of the outer body are of the shape indicated at 317 while the formers providing the skeleton of the rear portion of the outer body are of the shape indicated at 318. The formers 317 have a comparatively wide central portion which tapers both upwardly and downwardly to upper and lower edges. The formers 318 are similar in their upper parts to the formers 317 but terminate above the lower edges of the formers 317 in a lower edge 319.

The forward portion of the outer body extends around a major portion of the periphery of the aircraft and subtends an angle of approximately 253° at the center of the aircraft whereas the rear portion extends around an arc which subtends an angle of 107° at the center of the aircraft (see FIGURE 20).

The outboard edges of the formers 317 are covered with a sheet metal covering 320 and their inboard edges are covered with a sheet metal covering 321. The outboard edges of the formers 318 are covered with a sheet metal covering 322 and their inboard edges are covered with a sheet metal covering 323. The inboard surfaces of the upper portions of the coverings 321, 323 provide fixed guide means which directs propulsive gas passing through the upper peripheral nozzle in directions generally upwardly and inboardly. In a similar manner the lower portion of the covering 321 provides fixed guide means which directs gas flowing through the forward portion of the lower peripheral nozzle generally downwardly and inboardly. Pivotally attached to the lower edge 319 of the rear portion of the outboard body structure is a series of flaps 324 arranged in end-to-end relation. It will be seen from FIGURE 20 that there are eight flaps each extending a circumferential length equal to the distance between three ribs on the inboard body structure. Each flap is of double-walled construction and is dished at 325. The flaps are movable between first positions, shown in full lines in FIGURE 21, and second positions, shown in phantom lines in FIGURE 21, by being rocked about their pivotal mountings on the lower edge 319 of the rear portion of the outboard body structure. The flaps are rocked by a series of actuators, one actuator being provided for each flap. An actuator is indicated at 326 and is pivotally connected at its upper end at 327 to the inboard body structure. Each actuator is provided with a ram 328 which extends across the lower peripheral nozzle and is pivotally attached to a flap 324 between spaced lugs 329 arranged substantially centrally of the lower edge of the flap. The rams 328 pass through apertures 330 in the covering of the inboard body structure. It will be appreciated that, as the actuators 326 are operated, the flaps are rocked between their first and second positions and that during movement of the flaps the actuators will pivot about the pivot points 327. The apertures 330 are made of larger diameter than the rams 328 since the rams will move transversely of the apertures during movement of the flaps. The actuators are provided with compressed air bled from the compressors of the engines and are operated by an electro-pneumatic valve (not shown) controlled by the switch 295 on the pilot's control column.

The outboard body structure is held in juxtaposed spaced relationship with the outlet nozzle 86 by means of spokes 44 in a manner similar to that hereinbefore described for the other embodiments of the invention, however it will be noted that the guide vanes 199 and 200 are omitted in this embodiment of the invention. The primary gas deflecting means consisting of the baffles 220, 221 with their associated operating mechanism is identical to that previously disclosed.

The functions of the various components of the aircraft of FIGURES 1 to 13 will now be described. When the gas turbine engines 72, 73 and 74 are put into operation they will discharge their products of combustion into the "tusk" manifolds 119, 120, 121. The gases flowing at high velocity through these manifolds will be directed downwardly through the slots 123 in the manifolds and will then pass through the guide vanes 128 into the tip turbine constituted by the blades 157 on the outer periphery of the rotor. After leaving the turbine, the gases will pass through the exhaust boxes between the guide vanes 137 and the walls 138 and, except for the exhaust boxes adjacent to the air intake passages for the engines, will be discharged into the gas displacement passage as shown in FIGURE 6B and will flow outboardly along the passage. In positions where the exhaust boxes overlie the air intake passages for the engines, such as in FIGURE 6A, the exhaust gases are deflected by the deflecting walls 68, 68a and 68b so that the exhaust gases pass into sectors of the gas displacement passage radially adjacent to the air intake passages for the engines.

The flow of the high velocity gases through the turbine constituted by the blades 157 causes rotation of the rotor 45 thus to impel air to flow within the structure and along the gas displacement passage provided between the radial ribs so that the air is forced out of the outboardly divergent outlet nozzle 86. Thus, except for positions adjacent to the air intakes of the engines, air flows outboardly along the sectors of the gas displacement passage, is guided by the vanes 232 into the outboardly divergent outlet nozzle 86 and then passes through one or both of the upper and lower peripheral nozzles provided between the outboard body structure and the inboard body structure. Where spaces between adjacent ribs lead to the air intakes of the engine, as shown in FIGURE 6A, air passes outboardly between the ribs and is directed by the vanes 69a, 70a, 71a, into the elbows 117 and thence into the engines. Therefore, once the rotor has started to rotate, air will be forced into the engines by the impelling action of the rotor.

Movement of the baffles 220, 221 in the slots 79 and 80 of the upper and lower radiused webs at the outboard ends of the ribs of the inboard body structure will control the direction in which the gas passing through the gas displacement passage leaves the outlet nozzle 86. If the baffles 220, 221 project into the gas displacement passage by equal amounts then the gas will tend to pass radially outboardly until it is deflected by the outboard body structure. If the baffle 220 projects into the gas displacement passage more than does the baffle 221, then the propulsive gas will tend to be deflected downwardly to pass through the lower peripheral nozzle between the inboard and outboard body structures and more gas will pass through the lower peripheral nozzle than through the upper peripheral nozzle. Conversely, if the baffle 221 projects into the gas displacement passage more than does the baffle 220 the propulsive gases will tend to pass through the upper peripheral nozzle between the inboard and outboard body structures and more gas will pass through the upper nozzle than through the lower nozzle. It will be appreciated that the baffles 220, 221 move together by virtue of the straps 225 and are controlled by movement of the cables 188 through the agency of the bellcranks 226 to the arms of which the straps 225 and the cables 188 are connected. The baffles 220, 221 may therefore be operated to apportion the flow of propulsive gas between the upper and lower peripheral nozzles.

The deflection of the propulsive gas is attributable to the Coanda effect. (See aforementioned application Serial No. 684,615 for explanation and discussion of Coanda effect.) Thus, supposing that the baffle 220 projects into the gas displacement passage and the baffle 221 is retracted from the passage, gas flowing through the passage will be caused to "break away" from the skin 87 constituting the upper wall of the passage, by the projection of the baffle 220. However, the major portion of the gas will flow smoothly over the lower wall of the gas displacement passage and will follow the contour of the skin attached to the lower radiused webs 78 by virtue of the Coanda effect, and will flow outboardly and downwardly to pass through the lower peripheral nozzle. The effect of the baffle 220 is assisted by a directing stream of gas which issues from the slot 79. Some of the propulsive gas impinging on the inboard surface of the baffle 220 is directed by the baffle into the chambers between the upper radiused webs 77 of the adjacent ribs. These chambers are completely closed except for the slots 79 and therefore gas is forced from the chambers through the slots 79 along the outboard surfaces of the baffles 220 since the pressure in the gas displacement passage is less at positions outboardly of the baffle than at positions inboardly thereof.

Conversely, if the baffle 221 is caused to project into the gas displacement passage and the baffle 220 is retracted, then the major portion of the gas is caused to break away from the lower wall of the gas displacement passage and tends to pass upwardly and outboardly around the skin attached to the upper radiused webs 78 of the ribs by virtue of the Coanda effect and therefore passes through the upper peripheral nozzle. Some of the propulsive gas is deflected by the inboard surface of the baffle 221, enters the spaces between the lower radiused webs 78 of the ribs, and is ejected adjacent to the outboard surfaces of the baffle 221 to assist in directing the remainder of the propulsive gas.

It will be seen that by operation of the baffles 220, 221 the quantities of air and exhaust gases from the turbines which flow through the upper and lower peripheral nozzles can be controlled. That is to say, operation of the baffles 220, 221 apportions the flow of propulsive gases between the upper and lower peripheral nozzles.

The baffles 203, 204 in the outboard body may be operated to assist in the deflection of the gases passing through the upper and lower peripheral nozzles. Where the baffles 203, 204 project from the surface of the outboard body they will cause the gas flow to break away from the outboard body surface and will assist the gas to follow the curvature of the upper and lower radiused webs 77 and 78. It will be seen in FIGURE 9 that the baffles 203, 204 at the forward portion of the aircraft project fully into the upper and lower peripheral nozzles, whereas at the rear of the aircraft the baffles are fully retracted. If the actuators 216 are operated to move the baffles 203, 204 forwardly then the baffles in the forward part of the outer body will be retracted and those in the rear portion of the outer body will be projected and, if the actuators are moved sufficiently, the baffles will assume a position in which they project equally around the whole periphery of the aircraft. As mentioned above, the actuators 216 are controlled directly from the pilot's control column through the switch 295.

Returning now to the baffles 220, 221, which constitute the primary gas deflecting means, these can be operated in unison, i.e. to an equal extent at all points around the aircraft periphery, by means of the actuator 166. If the actuator is operated to raise the rod 169 then the bell-cranks 183 are caused to pivot by the co-action of their inboard ends with the mushroom head 171 of the rod 169. The bell-cranks all rock to an equal extent and will draw the links 185 inboardly to an equal extent. The links 185 will, in turn, move the T-pieces 187 inboardly to equal extents which will move the lower arms 226b of the bell-cranks 226 inboardly. Movement of the lower arms of the bell-cranks 226 inboardly will raise the upper arms 226a and will cause the upper baffle 220 to retract into the slots 79 and the lower baffle 221 to project from the slots 80. Conversely, if the actuator 166 is operated to lower the rod 169, the springs 230 will pull the cables 188 outboardly and the baffle 220 will project from the slots 79 whereas the baffle 221 will retract into the slots 80. Movement of the baffles 220, 221 under the influence of the actuator 166 is equal throughout the periphery of the aircraft and is to be distinguished from the swashing movement of the baffles which will hereinafter be described.

Referring now to FIGURE 7, the control shaft 163 is secured in the diaphragm 160 at the upper end of the vertical shaft 146, and the upper end of the control shaft is connected through diaphragm 161 to the upper end of the sleeve 147 on which the rotor is mounted. If the rotor now tilts about the spherical bearing 148 it will apply a force to the upper end of the control shaft 163 which will pivot about the fulcrum provided by the diaphragm 160, and the control shaft will be deflected from its central position which is shown in FIGURE 7.

Thus, if the rotor tips to the rear from its neutral position the lower end of the control shaft 163 will move forwardly and in so moving will affect the cables 188 and the primary gas deflecting means, which includes the baffles 220, 221 connected thereto. All the cables will be moved to some extent but the cables affected most will be those attached to the links 184 lying in, or nearest to, the plane of movement of the control shaft.

For reference purposes let it be considered that the longitudinal axis of the aircraft lies north and south and that the aircraft is facing north (see FIGURES 28 and 29). Using these axes of references, as the rotor tips to the rear from its neutral position the lower end of the control shaft will move from its central position to the north and the rotor has tipped towards the south. The plane containing the positions of the rotor spin axis corresponding to both the neutral and tilted positions of the rotor is the north-south plane. The cables 188 which are most affected by the northerly movement of the lower end of the control shaft are those connected, via the links 185 and T-pieces 187, to the links 184 lying in, or nearest to, the north-south plane. The links 184 to the north of the lower end of the control shaft 163 will be moved outboardly and the links 184 to the south of the lower end of the control shaft will be moved inboardly.

The links 185 are dimensioned and arranged so that the cables 188 most affected by the movement in any given direction of the control shaft will be advanced, in a clockwise sense, i.e. in the direction of rotation of the rotor, by a phase angle of 20° relative to the plane containing both positions of the spin axis corresponding to the neutral and tilted positions of the rotor, in the present case, the vertical plane containing the north-south axis as mentioned above. Thus the portions of the baffles 220, 221 affected most by the northerly movement of the lower end of the control shaft will lie adjacent to a vertical plane 20° east of north and 20° west of south, i.e. a plane advanced 20° from the north-south plane containing both said positions of the spin axis. This advanced plane is referred to for convenience as the control plane (see FIGURE 28).

All the cables 188 will be moved to varying extents by movement of the control shaft. The cables moved to the greatest extent will be adjacent to the control plane and the cables moved to the least extent will be adjacent to a plane normal to the control plane.

The cables 188 in the sector indicated by the line 400 in FIGURE 28, will be moved outboardly and the cables moving most will be those adjacent to the control plane. As the cables move outboardly the baffles in the sector will move downwardly (see FIGURE 29), so that propulsive gas will tend to flow through the lower peripheral nozzle in preference to the upper peripheral nozzle and will therefore provide an upward reaction on the associated sector of the aircraft.

All the cables in the sector indicated by the line 401 in FIGURE 28 will be moved inboardly so that the baffles 220, 221 in this sector will be moved upwardly (see FIGURE 29), and propulsive gas will flow through the upper peripheral nozzle in preference to the lower peripheral nozzle. The greatest movement of the baffles will be in the control plane. The general gas flow pattern for a nose-up moment applied by the gas deflecting means is shown in FIGURE 25.

As the result of moving the lower end of the control shaft forwardly, the aircraft is subjected to a moment which may be considered to be a couple acting in the control plane. This couple may be resolved into two components, namely a component in the north-south plane applying a pitching moment to the aircraft and a component in the east-west plane applying a rolling moment to the aircraft. If the phase angle is designated "$\alpha$," then the first component will be proportional to cosine $\alpha$ and the second component will be proportional to sine $\alpha$.

Moreover, the first component will amplify the gyrocouple applied to the aircraft by the rotor as the latter tilts within the aircraft and the second component would oppose a rotational velocity acquired by the aircraft and which would cause the rotor to tilt from its neutral position. This is explained in more detail hereinafter with reference to FIGURES 17, 17A, 18 and 18A.

The movement of the control shaft 163 may be initiated by operation of the actuators 176, 178 and 179 which are controlled from the pilot's control column.

As described above, each of the actuators 176, 178 and 179, is attached by a conduit 253 to one of the nozzles 251. The relative positions of the associated nozzles and actuators are 90° out of phase as will now be described. Thus referring to FIGURES 13 and 13A it will be seen that the nozzle 251a lies on the longitudinal axis of the aircraft which is indicated by the arrows. The nozzle 251a is connected to the actuator 176 which, as will be seen from FIGURE 3, is on the lateral axis of the aircraft and, in a clockwise direction, is 90° in advance of the nozzle 251a. Similarly, the nozzle 251b is connected to the actuator 178 which, as will be seen from FIGURE 13A, is 90° in advance of the nozzle in a clockwise direction. Finally, the nozzle 251c is connected to the actuator 179 which is 90° in advance of the nozzle in a clockwise sense.

The actuators 176, 178 and 179 are caused to operate by variations in pressure in the conduits 253. As mentioned above, the plenum chamber 247 in the double-walled sleeve 246, is provided with high pressure air bled from the compressors of the gas turbine engines. This high pressure air flows through the inner stack pipes 252 of each of the nozzles 251 and, due to the presence of the plate 271, maintains a pressure in each of the conduits 253. If the plate 271 (see FIGURE 12) is spaced by an equal distance from each nozzle then the pressure produced in each of the conduits 253 is equal. Suppose now that the plate 271 is equally spaced from the nozzles 251 when the plate is horizontal and that the pilot pulls the handle 257 in a rearward direction. The rod 256 will flex above the bearing 254 and the plate 271 will tilt so that it will move away from the nozzle 251a and will move towards the nozzles 251b and 251c. As a result, the pressure in the conduit 253 connected to the nozzle 251a will decrease and the pressure in the other two conduits will increase. As a result of the decrease in the pressure in the nozzle 251a, the pressure in the actuator 176 will be reduced and the pressure in the other two actuators 178, 179 will be increased due to the increase of pressure in their associated nozzles 251b and 251c. Due to the changes in pressure the actuators will apply a force to the control shaft tending to move its lower end towards the actuator 176, i.e. in a direction at 90° to the direction at which the pilot first moved the handle 257. Similarly, any force applied to the control shaft by the actuators 176, 178 and 179 acts in a direction advanced 90° in a clockwise sense from the direction in which the pilot moves his handle 257 so that if the pilot moves the handle 257 to his left the force applied to the control shaft by the actuators 176, 178 and 179 will tend to move it forwardly.

The hand wheels 280, 281 may be used to trim the aircraft by providing a fine adjustment for the positions of the nozzles 251 relative to the plate 271. By rotation of the cam wheels 274 and 275, the sleeve 273 together with the associated double-walled sleeve 246 and the nozzles 251 may be adjusted about two axes at right angles. Thus fine adjustment of the distance between the outlets of the nozzles 251 and the plate 271 may be obtained with correspondingly fine adjustment of the position of the control shaft 163 by means of the actuators 176, 178 and 179.

As mentioned above, the rudder actuators 236 are connected to conduits 270 which lead to nozzles 268 associated with the tongue 260 at the base of the control column. If the pilot rotates the handle 257 the tongue 260 is moved by the cam 259 so that it moves closer to one of the nozzles 268 and further away from the other nozzle. By moving the tongue 260, therefore, the relative pressures in the conduits 270 may be varied and, as will be seen from FIGURE 11, each conduit 270 is connected to each of the actuators 235 but between the actuators the conduits are crossed so that the rudder vanes in both groups will move in the same clockwise or anticlockwise sense.

It will thus be seen that the pilot can control the aircraft in yaw by rotation of the handle 257.

The aircraft may be considered to have a body structure and engine means within the structure to provide propulsive gas, the engine means including the rotor 45 and the gas turbine engines 72, 73, 74. The aircraft has an outlet nozzle 86 which is arranged to discharge the propulsive gas at a multiplicity of positions distributed around the periphery of the body structure. The primary gas deflecting means are associated with the nozzle and are operable to variably control the flow characteristics of the propulsive gas discharged from the nozzle 86 at any selected position of the multiplicity of positions at which the outlet nozzle discharges the propulsive gas. The rotor 45 comprises a gyroscope which is rotatable about a spin axis and the gyroscope has a neutral position relative to the body structure, the neutral position being with the rotor horizontal when the aircraft is horizontal and with the spin axis vertical and parallel, in this particular aircraft coincident, with the yaw axis of the aircraft. In all the drawings, except FIGURE 29, the rotor is shown in its neutral position.

The springs 230 acting through the bell-cranks 226 and the cables 188 provide means which bias the rotor to its neutral position within the body structure although they allow the rotor to move relatively to the body structure. The springs 230 and the cables 188 also cause the rotor to tilt from an original steady state position when the aircraft acquires a rotational velocity about a turn axis lying normal to the spin axis when the rotor is in said original position. Thus, to take an example, suppose that the rotor is rotating in its neutral position, which may be considered as an original steady state position, with its spin axis vertical then, if the aircraft acquires a rotational velocity about a turn axis normal to said spin axis, in this example about a horizontal axis, the rotor will be caused to tilt from its original position by virtue of the springs 230 and the cables 188.

The cables 188 with their associated links 184, 185 at the inboard ends thereof and with the bell-cranks 226 at the outboard ends thereof constitute a link system interposed between the gyroscope, constituted by the rotor, and the primary gas deflecting means, constituted by the baffles 220, 221. Moreover, the link system operates the baffles as described with reference to FIGURE 28 in a manner determined by the tilted position of the rotor. The cables 188 radiate from the control shaft 163 and constitute individual links of the link system and it will be seen that the individual links may be considered to be operatively coupled to correlated portions of the gas deflecting means spaced around the periphery. Moreover, links of the system which are operatively coupled to peripherally opposite portions of the gas deflecting means are interconnected by being connected at their inboard ends to the control shaft 163.

Referring to FIGURES 28 and 29, for any given tilt of the rotor, opposite peripheral portions of the gas deflecting means lying adjacent to a control plane are operated. The control plane contains the position of the spin axis corresponding to the neutral position of the rotor and is advanced in the direction of rotation of the rotor by a phase angle α, in this case, 20°, relative to the plane containing the positions of the spin axis corresponding to the neutral and tilted positions of the rotor. Thus in FIGURE 28 the plane containing the positions of the spin axis corresponding to the neutral and tilted positions of the rotor is the north-south plane and the control plane is advanced 20° clockwise, i.e. in the direction of rotation of the rotor, relative to the north-south plane. The opposite peripheral portions of the gas deflecting means operated by tilt of the rotor are indicated by the sectors 400 and 401 in FIGURE 28.

Referring now to FIGURES 14, 15 and 16, the functioning of the control system of the aircraft there shown is the same as the functioning of the aircraft shown in FIGURES 1 to 13 with the exception that operation of the slide 305 replaces operation of the baffles 203 and 204 of the first embodiment. When the slide 305 is in a position such that its apertures 310 are in register with the gas entry ports 302 in the outboard body structure, propulsive gas enters the gas entry ports 302 and is deflected by the channel member 194 so that the gas issues from the slots 201 and 202 all around the periphery of the aircraft in the form of directing streams. It will be seen from FIGURE 15 that the gas will issue in streams having inboardly directed components of velocity and that these streams will assist the propulsive gas discharged from the outlet nozzle 86 to flow around the upper and lower radiused webs 77, 78 and the guide vanes 199 and 200. The proportion of the total propulsive gas which flows through each of the upper or lower peripheral nozzles will be controlled by the primary gas deflecting means, i.e. by the baffles 220 and 221, in a manner similar to that described for the aircraft shown in FIGURES 1 to 13.

If the slide 305 is moved so that the gas entry ports 302 in the rear portion of the outer body are closed by the slide, then propulsive gas around the rear portion of the aircraft will be prevented from entering the gas entry ports 302. Under these circumstances, gas moving radially outboardly from the outlet nozzle 86 around the rear portion of the aircraft will impinge upon the rear portion of the outboard body structure, will divide and will flow over both the upper and lower surfaces of the outboard body structure.

The functions of the various controls in the embodiment of the invention as shown in FIGURES 17 and 17A are the same as the similar controls with reference to the aircraft shown in FIGURES 1 to 13. However, due to the omission of the links 185, the phase angle of the control system is 0°, i.e. the control plane adjacent to which the portions of the baffles 220, 221 are most affected for a given tilt of the rotor will be coincident with the plane containing the positions of the spin axis corresponding to the neutral and tilted positions of the rotor.

Thus, referring to FIGURE 28 and assuming that the rotor tilts in a southerly direction from its neutral position, the lower end of the control shaft will move northerly. As before, the north-south plane will contain the positions of the spin axis corresponding to the neutral and tilted positions of the rotor. Since, however, the inboard ends of the cables are connected directly to the links 184 the control plane will also be the north-south plane, i.e. the plane containing the positions of the spin axis for the neutral and tilted positions of the rotor.

The aircraft will be subjected to a moment which, as before, may be resolved into two components, a first component in the north-south plane applying a pitching moment to the aircraft and a second component in the east-west plane applying a rolling moment to the aircraft. However, since the phase angle in this case is 0° and since the first component is proportionl to the cosine of the phase angle and the second component is proportional to the sine of the phase angle, it follows that the second component will be zero so that the resulting moment will be in the control plane. This moment amplifies the gyro-couple applied to the aircraft by the tilting of the rotor within the aircraft. Thus as the rotor tilts in a southerly direction it will apply a moment to the aircraft tending to pitch the aircraft nose up. The resulting movement of the baffles 220, 221 will be to retract the baffle 221 and advance the baffle 220 at the forward portion of the aircraft and retract the baffle 220 and advance the baffle 221 at the rear portion of the aircraft. The aircraft will therefore be given a nose-up pitching moment which, as will be seen, amplifies the nose-up pitching moment imparted to the aircraft due to pitching of the rotor within the aircraft. The gyro-couple applied to the aircraft by pitching of the rotor is applied to the aircraft through the springs 230.

The functions of the various controls in the embodiments shown in FIGURES 18 and 18A are the same as the similar controls described with reference to the aircraft shown in FIGURES 1 to 13. However, in FIGURES 18, 18A, the phase angle of the control system is 90° so that the control plane for the system is advanced 90° in the direction of rotation of the rotor. Thus, due to the interposition of the right-angled links 350, if the rotor tilts in a southerly direction and the lower end of the control shaft moves in a northerly direction the cables 188 to the East will be moved outboardly and the cables 188 to the West will be moved inboardly. As a result the baffles 220, 221 will be operated to apply a rolling moment to the aircraft about its longitudinal axis tending to roll the aircraft in an anti-clockwise direction when viewed from the rear. The rotor may be caused to pitch in a southerly direction if the aircraft attains a rotational velocity tending to turn it to a clockwise direction upon its longitudinal axis when viewed from the rear. It will therefore be seen that the moment applied to the aircraft is such as to directly oppose the rotational velocity which the aircraft has acquired. The general statement that the couple applied to the aircraft may be resolved into two components proportional to the cosine of the phase angle and the sine of the phase angle still holds good. However, since the phase angle is 90° the component proportional to the cosine of the angle, i.e. the component which tends to amplify the gyro-couple applied to the aircraft, is zero and only the component tending to roll the aircraft and to directly oppose the rotational velocity acquired by the aircraft is actually applied to the aircraft.

The functioning of the control system of the aircraft shown in FIGURES 19, 20 and 21 is the same as that of the control system of the aircraft shown in FIGURES 1 to 13, with the exception that operation of the flaps 324 replaces operation of the baffles 203, 204 of the aircraft of FIGURES 1 to 13.

When the flaps 324 are in their first position (shown in full lines in FIGURE 21), gas issuing through the lower peripheral nozzle due to the operation of the primary gas deflecting means will be directed substantially inboardly and downwardly. Conversely, gas issuing through the upper peripheral nozzle due to operation of the primary gas deflecting means will be deflected generally inboardly and upwardly. If now the flaps 324 are moved to their second positions (shown in phantom lines in FIGURE 21), propulsive gas issuing from the forward portion of the lower peripheral nozzle will still be directed generally inboardly and downwardly. However, gas issuing from the rear portion of the lower peripheral nozzle will pass generally downwardly and outboardly and will give to the aircraft a forward and upward thrust.

The operation of the embodiment of the aircraft described in FIGURES 1 to 13 will now be described. The aircraft is capable of taking off and landing vertically and of assuming forward flight after it has risen to a desired height. The aircraft is provided with a control system which is under the control of the pilot and also with an automatic control system to reduce the divergence of the aircraft incident upon a disturbance which imparts to the aircraft a rotational velocity about a turn axis lying normal to the spin axis of the rotor. The control system reduces the divergence of the aircraft incident upon rolling or pitching moments, i.e, moments tending to impart a tilt rate to the aircraft.

When the gas turbine engines 72, 73, 74 are started, air and exhaust gas flow outboardly along the gas displacement passage, through the outlet nozzle and, depending on the positions of the primary gas deflecting means, through either or both of the upper and lower peripheral nozzles. For take-off, the controls are set in such a position that the secondary gas deflecting means, i.e. the baffles 203, 204, project into the upper and lower peripheral nozzles equally around the whole periphery of the aircraft. The primary gas deflecting means is operated to divert substantially the whole of the propulsive gas through the lower peripheral nozzle and to this end the actuator 166 is operated to retract the baffle 221 into the slots 80 and to project the baffle 220 from the slots 79. Propulsive gas therefore flows outboardly along the gas displacement passage, but its flow along the upper wall of the passage is interrupted by projection of the baffle 220 and the gas passes downwardly and inboardly through the lower peripheral nozzle. The gas tends to flow along the guide vanes 200 and along the covering of the lower radiused webs 78 of the ribs of the inboard body structure by virtue of the Coanda effect. This downward and inboard flow is assisted by the projection of the baffle 204 which interrupts flow of gas along the lower surface of the outboard body structure. Air is induced to flow through the upper peripheral nozzle by the flow of propulsive gas through the lower peripheral nozzle and this induced air flow is indicated by the arrows in FIGURES 22 and 23 and joins the main flow of gas to increase its thrust slightly.

The general pattern of flow is shown in FIGURE 22 from which it will be seen that the gas flows inboardly and downwardly until it is adjacent to the ground when it curls outboardly. With this setting of the controls it has been found that, when the aircraft is adjacent to the ground, the gas ejected from the aircraft forms a downwardly moving tubular curtain which provides thrust augmentation for landing and take-off. This thrust augmentation when the aircraft is adjacent to the ground is known as the "ground cushion effect" and is obtained with a downwardly moving tubular curtain of gas as described.

As the aircraft rises, the tubular curtain of gas becomes substantially solid as shown in FIGURE 23. When the aircraft is at a substantial height above the ground the propulsive gas leaving the lower peripheral nozzle is able to move inboardly to a greater extent than when the aircraft is adjacent to the ground, and the streams from the various portions of the periphery of the aircraft merge to form a solid jet of downwardly moving gas which propels the aircraft upwardly.

When hovering in free air as shown in FIGURE 23, the upward thrust on the aircraft is greater than the static thrust of the engines. It is believed that the thrust augmentation in free air is due to the following facts:

(1) The gas discharged from the lower peripheral nozzle has a large surface area and entrains a substantial quantity of the ambient air. This entrainment increases the mass flow and reduces the speed of the gas flow.

(2) The propulsive gas issuing from the lower peripheral nozzle and the entrained ambient air is caused to traverse the lower aerofoil surface and is deflected downwardly away from the surface with components of velocity generally normal thereto. This downward deflection causes an upward reaction on the surface which provides a lift force for the aircraft.

The propulsive gas is caused to traverse the lower aerofoil surface by means of the primary and secondary gas deflecting means; the baffles 220, 221 and 203, 204 respectively as hereinbefore explained. The gas discharged from the nozzle is "bent" inboardly, and the flows of gas coming towards the center of the surface from opposing directions meet adjacent to the center and, since the gas cannot move upwardly due to the presence of the lower aerofoil surface, the gas is deflected downwardly thus providing the upward reaction on said lower surface.

When the aircraft has reached the desired height, the pilot operates the controls to transfer the aircraft from hovering to forward flight. This is accomplished by moving the secondary gas deflecting means, i.e. the baffles 203, 204, so that they are fully retracted at the rear portion of the aircraft and project fully at the forward portion of the aircraft, while at the same time operating the actuator 166 to raise the baffles 220, 221 until they both project to approximately an equal extent into the gas displacement passage. In this position of the controls the gas flow through the upper and lower peripheral nozzles will be substantially equal all around the aircraft as shown in FIGURE 24. Since the secondary gas deflecting means, i.e. the baffles 203, 204, at the forepart of the aircraft project from the outer body structure, the propulsive gas leaving the forward portion of the outlet nozzle is caused to flow around the guide vanes 199 and 200 as may be seen from FIGURE 24. Since the baffles 220, 221 each project from the upper and lower walls of the gas displacement passage the flow of gas is interrupted on both walls but the gas is caused to flow around the guide vanes 199, 200 by the Coanda effect. The Coanda effect is assisted by the fact that the gas is not permitted to flow smoothly around the forward portion of the skin of the outer body structure due to the projection of the baffles 203, 204 at the forward portion of the aircraft.

At the rear portion of the aircraft, however, where the baffles 203, 204 are retracted, the gas is able to pass substantially radially outboardly and is caused to follow the outer surface of the outboard body structure due to the Coanda effect. This results, as will be seen from FIGURE 24, in a generally backwardly and downwardly deflected stream of propulsive gas. The gas flowing through the lower peripheral nozzle in the forward portion of the aircraft is constrained to flow along the underside of the aircraft as shown, and meets the gas ejected from the upper and lower peripheral nozzles at the rear of the aircraft. As a result the aircraft is propelled forwardly and also obtains some lift from the downward direction of the rearwardly discharged propulsive gas. Moreover, since the aircraft cross section is an aerofoil, as the aircraft moves forwardly it experiences aerodynamic lift in a manner similar to the wings of a conventional aircraft.

The response of the aircraft to the automatic stabilization system and to the pilot's control system will now be considered. However, before considering the response in detail it is necessary to mention several points. As has been pointed out above, the aircraft can hover above the ground and it can also move in forward flight; in forward flight, the response of the aircraft is affected by a de-stabilizing moment which does not affect it when hovering. The aircraft which have been described are generally disc-shaped and the centers of gravity of these aircraft are approximately at the centers of the discs. On the other hand, since the sheathing of the aircraft causes the aircraft to act as an aerofoil, the center of pressure is approximately one-third of the chord length behind the leading edge. Thus the center of pressure is in front of the center of gravity during forward flight. It follows that, if the aircraft hits an up-gust in forward flight the angle of attack of the aircraft will increase which will increase the lift which, in turn, will increase the pitching moment since the center of pressure is in front of the center of gravity. A converse effect will occur with a nose down pitching moment: as the aircraft pitches nose down the angle of attack decreases, which decreases the lift which decreases the angle of attack, and so on.

With the aircraft described, since there are no tail surfaces, the destabilizing moment causes a divergence in pitch which is extremely rapid so that, in forward flight if there were no correction, the aircraft would be overturned in a matter of one or two second after hitting a gust. This rate of divergence is so rapid that the pilot cannot control it manually.

In hovering, there is no destabilizing moment since the center of pressure and the center of gravity are in line. If the aircraft hits a gust while hovering the gust will tend to tip the aircraft but, since a gust may be considered to be an impulse and since there is no destabilizing moment, there will be no steady divergence; the divergence will be transient but will still be so rapid as to normally be beyond the manual control of the pilot.

It follows that both in forward flight, and in hovering, an automatic stabilization system is required to reduce the rate of divergence. The automatic stabilization system provided by the invention is so interconnected with the pilot's control system that the pilot controls the aircraft through the operation of the automatic stabilization system. The automatic stabilization system is brought into operation when the aircraft acquires a rotation velocity about a turn axis normal to the spin axis when the latter is in a steady state position; in other words the system operates if the aircraft acquires a tilt rate (be it a pitch rate or a roll rate). The aircraft may acquire a rate from an outside disturbance, e.g. a gust, or by a pilot input to the control system.

Another point which should be considered is that the aircraft will respond more readily to low frequency forces than to high frequency forces. The forces applied to the aircraft by the control system are, at least in part, a combination of high frequency and low frequency forces; for example the characteristic frequencies of the control system may be 3 cps., 15 cps. and 40 cps. However, the aircraft will respond more or less only to the low frequency forces, the high frequency movements of the control system being confined almost entirely to the control system.

The response of the aircraft will be described with reference to FIGURES 30 to 34 which show a series of graphs; each response is described by six graphs. The graphs show the following displacements and velocities:

(A) The roll angle of the aircraft in radians,
(B) The roll rate or roll velocity of the aircraft in radians per second
(C) The pitch angle of the aircraft in radians,
(D) The pitch rate or pitch velocity of the aircraft in radians per second,
(E) The amount of roll of the rotor within the aircraft measured as a percentage of its maximum roll which is set by structural limitations and may, for example, be ±¼° from the neutral position, and
(F) The pitch of the rotor within the aircraft measured as a fraction of its maximum pitch which is limited as is the maximum roll.

The response of the aircraft will depend on the phase angle between movement of the control shaft 163 and movement of the primary gas deflecting means which includes the baffles 220, 221. The damping of the system increases, up to a point, with an increase in phase angle. A system with zero phase angle has no built-in damping while a system with a 90° phase angle has considerable built-in damping as will be apparent from the following discussion. As described above with reference to FIGURE 28, the phase angle of the embodiment of FIGURES 1 to 13 is 20° clockwise, i.e. in the direction of rotation of the rotor.

Figure 30:
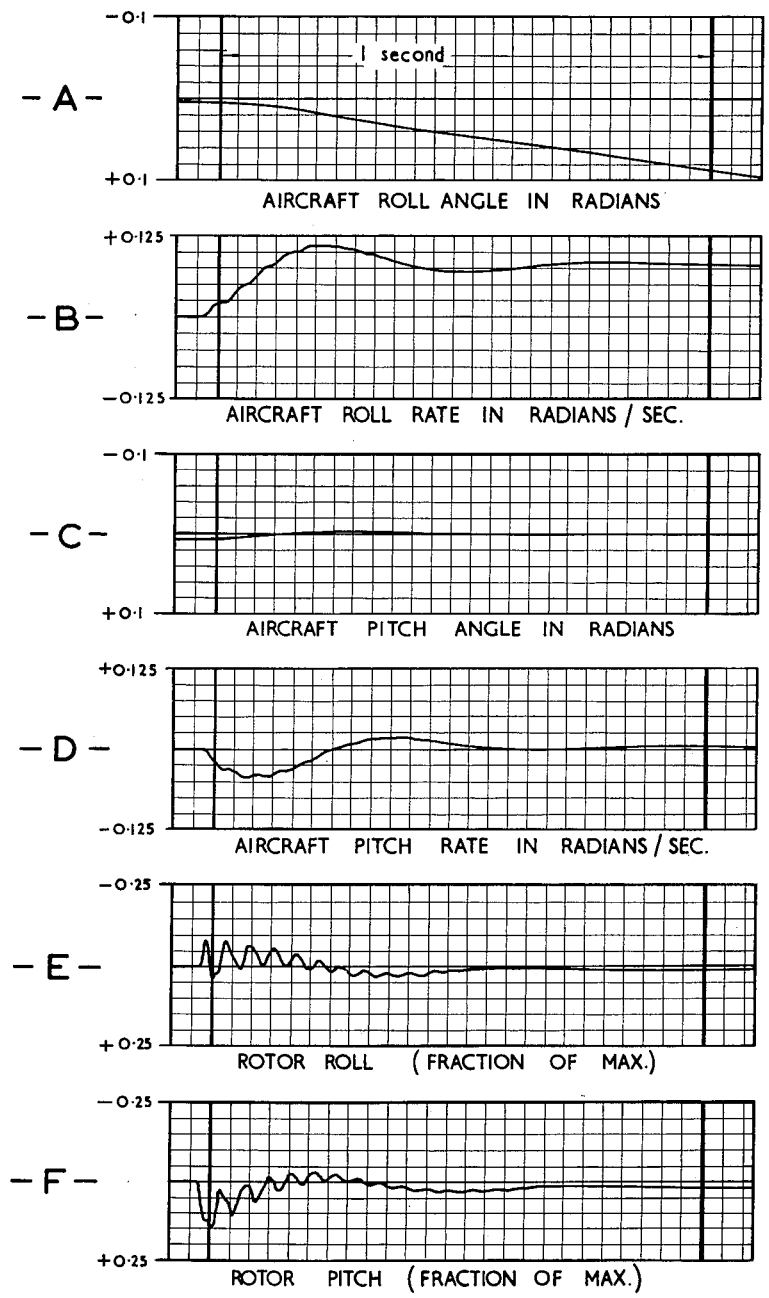

Referring to FIGURE 30, this shows the response of the aircraft of FIGURES 1 to 13 if, when it is hovering, the pilot moves his stick to the right. The amount which the stick is moved to the right is measured in terms of the resulting movement of the rotor, which is expressed as a percentage of the total permitted movement of the rotor in any direction, the various movements being considered as if the aircraft were on the ground with the rotor stationary. Thus, as mentioned above, the total movement of the rotor in any direction from its neutral position might be ¼°, therefore if the pilot moves his stick 10% to the right this will mean that he has moved his stick sufficiently so that, with the aircraft on the ground and the rotor stationary, the rotor would move from its neutral position by 10% of ¼°. As explained above, movement of the control column is 90° out of phase with the resulting force applied to the control shaft so that as the pilot moves his stick to the right the actuators will apply a pitching moment to the rotor by rocking the control shaft 163. Moreover the graphs have been prepared on the assumption that the pilot's input is a step input, i.e. a sudden input and not a slow movement in the desired direction.

Returning to FIGURE 30, as a result of the pilot's movement of the stick to the right he applies, through the control shaft 163, a pitching moment to the rotor which, as a result, acquires a pitch velocity, or pitch rate; as soon as it acquires this rate it is affected by the gyroscopic laws of motion and precession. By reference to graphs E and F of FIGURE 30 it will be seen that the rotor initially oscillates both in roll and in pitch and then acquires a steady state with a deflection in pitch and rather less of a deflection in roll. As the rotor oscillates, it operates the control system through the control shaft but the oscillations are of too high frequency to have much effect on the aircraft. In the final steady state, the deflection of the rotor is transmitted through the control shaft to operate the primary gas deflecting means to apply a moment to the aircraft which can be resolved into two components about the lateral and longitudinal axes of the aircraft. The component about the longitudinal axis of the aircraft overcomes the aerodynamic damping of the aircraft due to the internal flow of the propulsive gas through the gas displacement passage. Thus on one side of the longitudinal axis of the body of the aircraft tries to move the radially flowing gas downwardly whereas on the other side of the axis the body will tend to move the gas upwardly. The gas will oppose this movement with a force proportional to its mass, its radial velocity and the angular velocity of the aircraft. The component about the lateral axis of the aircraft is employed in overcoming the gyroscopic moment and causes the aircraft to roll.

Graphs A and B of FIGURE 30 show that, after initial oscillation in its roll rate, the aircraft acquires a substantially steady roll rate and a steadily increasing roll angle. Graphs C and D of FIGURE 30 show that the aircraft is substantially undisturbed in pitch but has initially an oscillating pitch rate which is damped out. The graphs show that the aircraft responds substantially only to the low frequency components of the rotor oscillations shown in graphs E and F.

Figure 31:
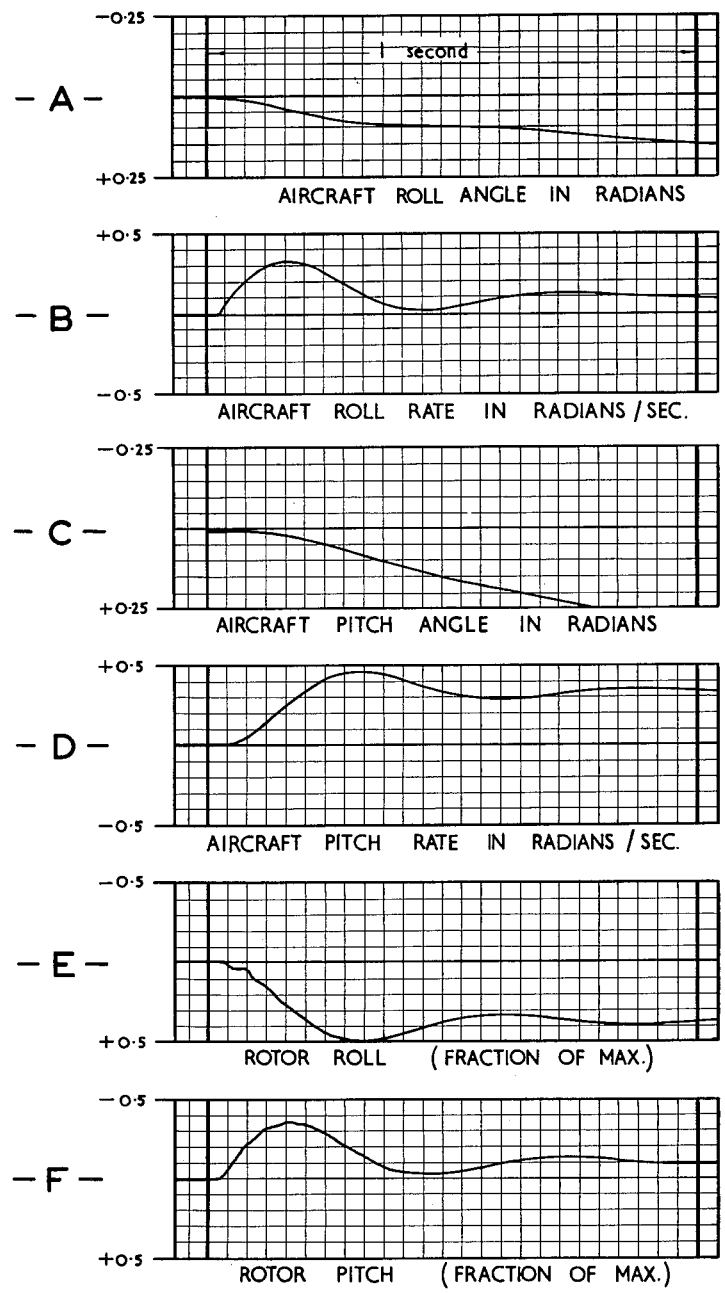

FIGURE 31 shows the response of the aircraft of FIGURES 1 to 13 if, when it is hovering, it encounters a steady rolling moment which is the approximate situation which might arise if the aircraft encountered a sudden side gust. The rolling moment imparts an increasing roll rate to the aircraft (graph B) and it will be seen that the rotor lags slightly behind the movement of the aircraft. The rotor then begins to catch up with the aircraft in roll and acquires a roll rate. Once the rotor acquires a roll rate it will follow the gyroscopic laws and its movement will be as shown in graphs E and F of FIGURE 31. It will be seen that after initial oscillation the rotor reaches a comparatively steady state with a deflection in roll and rather less of a deflection in pitch. The deflection of the rotor is transmitted through the control shaft 163 to operate gas deflecting means to reduce the divergence of the aircraft.

Graphs A and B of FIGURE 31 show that, after an initial sharp increase in roll rate, the roll rate decreases to a substantially steady value and the roll angle steadily increases. Graphs C and D show that the pitch velocity increases rapidly and settles down to a comparatively steady value and the pitch angle increases steadily. The divergence in pitch and roll is sufficiently slow for the pilot to be able to correct it.

Figure 32:
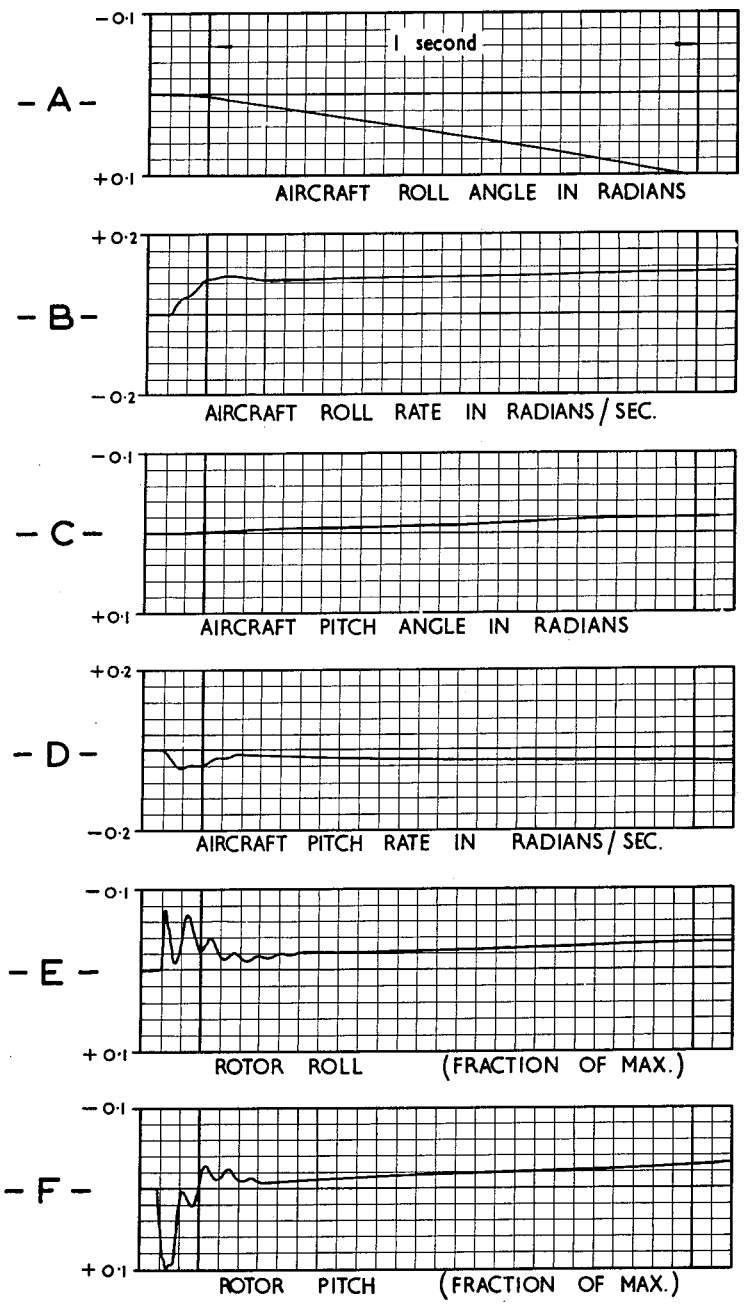
Figure 33:
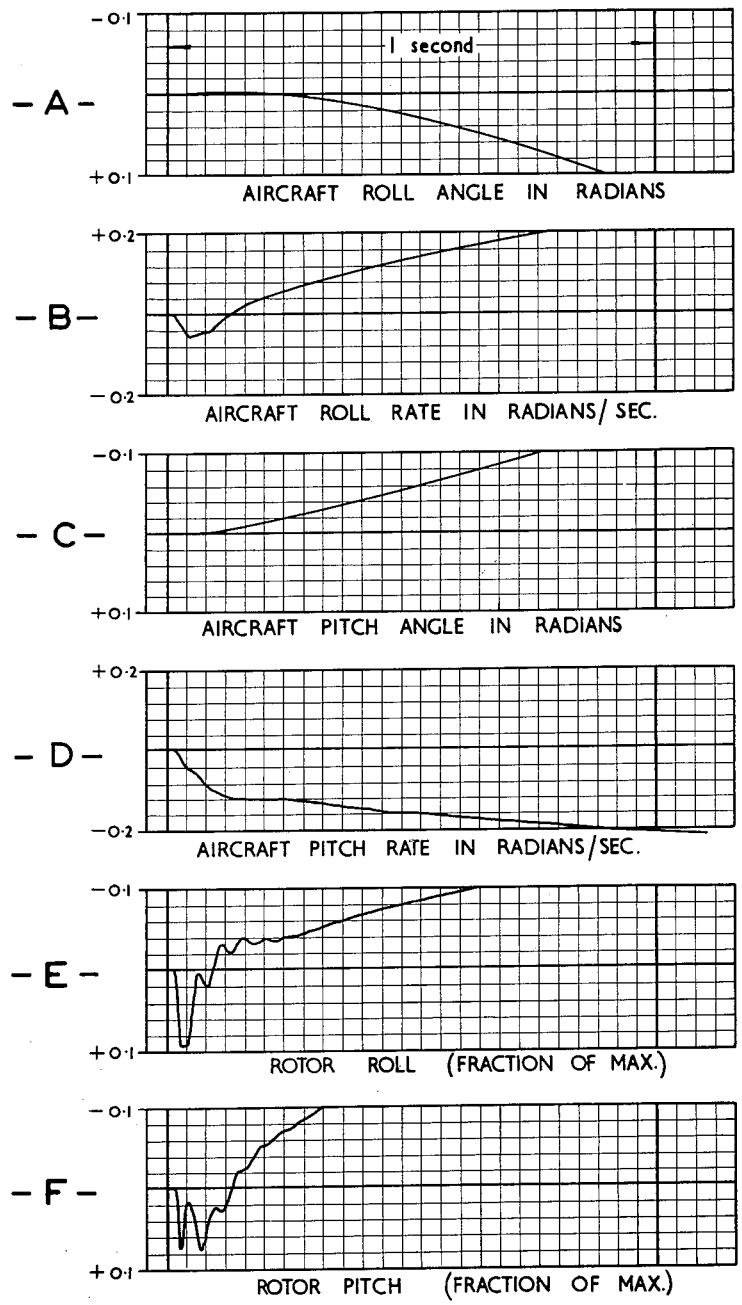
Figure 34:
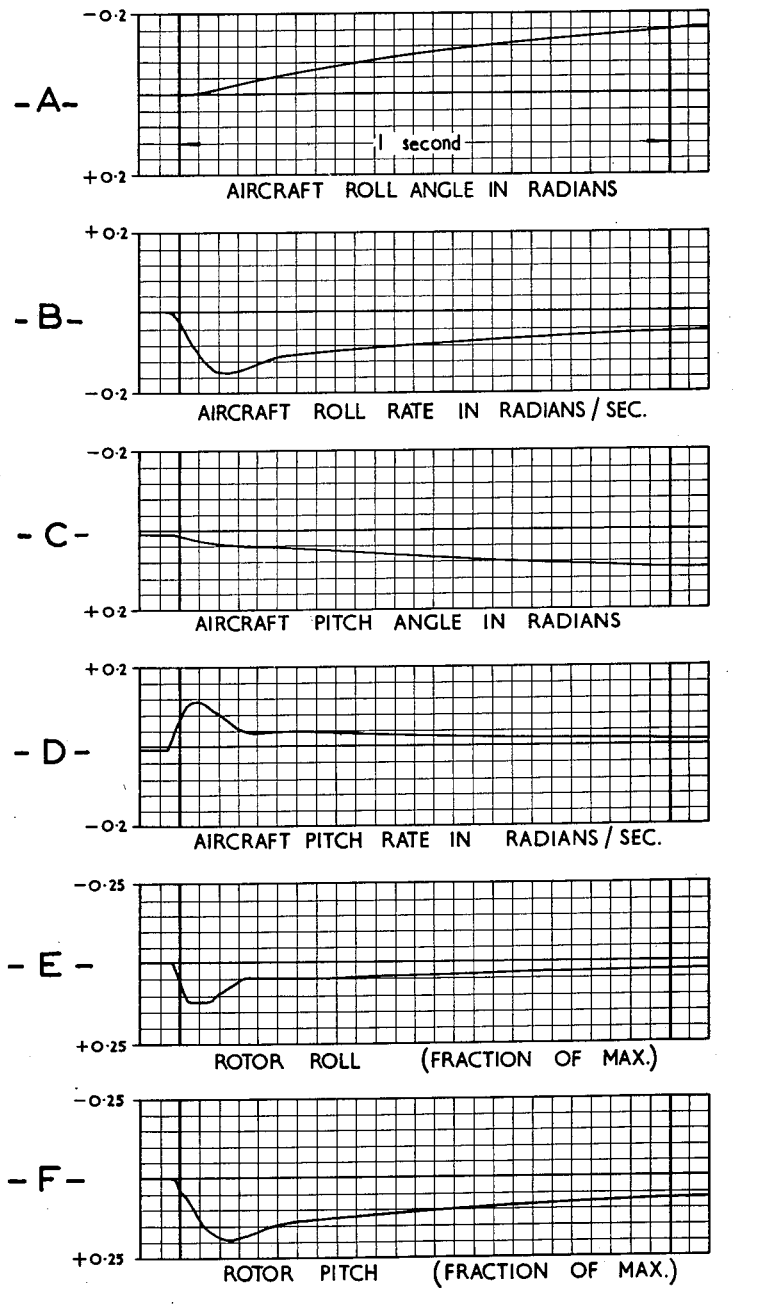

FIGURES 32, 33 and 34 show the response of the aircraft of FIGURES 1 to 13 when in forward flight. FIGURE 32 shows the response of the aircraft to the pilot moving his control column 10% to the right, the 10% movement being defined as above. The pilot input applies a pitching moment to the rotor which thus acquires a pitch rate and then follows the gyroscopic laws. The initial portions of the graphs of FIGURE 32 are substantially similar to the graphs of FIGURE 30, that is to say, the disturbance induced by the pilot produces, after the initial transient oscillations, a substantially constant roll rate with virtually zero pitch rate. However, since the aircraft has been caused to pitch to some slight extent, as will be seen from graph C of FIGURE 32, the de-stabilizing moment described above affects the performance of the aircraft. As a result the roll rate and the pitch rate diverge from their substantially steady states. The general overall effect of the de-stabilizing moment is to roll the aircraft, thus increasing the roll rate, which in turn increases the gyro-couple in pitch and causes an increase in pitch rate, which in turn increases the de-stabilizing moment and so on. However, the divergence is sufficiently slow to be controlled by the pilot.

FIGURE 33 shows the response of the aircraft to the pilot moving the stick 10% forward. Whereas in the response shown in FIGURE 32 the effect of the de-stabilizing moment was of secondary importance, since the main output was in roll, in FIGURE 33 the de-stabilizing moment is of primary importance and produces much more rapid divergence in roll rate and pitch rate. The pilot input applies a rolling moment to the rotor which acquires a roll rate and thereafter follows the gyroscopic laws of motion. The effect is essentially similar to that of FIGURE 32 except for the effect of the de-stabilizing moment which prevents the acquisition of steady roll and pitch rates. Thus as the aircraft begins to pitch nose down, the lift decreases, which in turn increases the nose-down pitch, which decreases the lift and so on as explained above. Graphs B and D of FIGURE 32 show the diverging roll rate and pitch rate but the divergence is sufficiently slow to be corrected by the pilot.

FIGURE 34 shows the response of the aircraft when it encounters a sharp edged gust having a speed of 10 ft. per second. In a gust in forward flight the disturbing moment on the aircraft varies due to the movement of the aircraft and should be distinguished from the situation in FIGURE 31 where it is assumed that a steady moment is applied to the aircraft while it is hovering. Referring to FIGURE 34, the gust applies a pitching moment to the aircraft which therefore acquires a pitch rate. The rotor lags slightly and then it also acquires a pitch rate and consequently starts to roll. In rolling, the rotor applies a rolling moment to the control system which starts to roll the aircraft. The resulting motions of the aircraft and the rotor are as shown in the graphs of FIGURE 34. The initial, comparatively high transient values of roll rate and pitch rate are reduced to comparatively small values but diverge due to the de-stabilizing moment as described above. It will be seen that the aircraft is displaced in both roll and pitch but more in roll than in pitch. As before, the divergence is sufficiently slow for the pilot to be able to control the aircraft.

When the aircraft is in forward flight, in addition to there being aerodynamic damping due to the internal air flow as described above, there is also external aerodynamic damping of the aircraft due to the flow of air over the external skin of the aircraft.

It will be seen that the control system operates to reduce the divergence of the aircraft following a disturbance to values which can be corrected by the pilot. Without the automatic stabilization system the aircraft could be overturned in a pitching gust too quickly for the pilot to be able to control the movement.

The operation of the aircraft shown in FIGURES 14, 15 and 16 is the same as the operation of the aircraft described with reference to FIGURES 1 to 13 with the exception of the operations required to change from hovering to forward flight, and vice versa.

As explained above, when the slide 305 is in such a position that the apertures 310 therein are in register with the gas entry ports 302 in the outboard body structure, then propulsive gas enters the gas entry ports and is deflected by the channel member 194 to produce directing streams of gas. For take-off, the slide 305 is arranged so that the apertures 310 are in register with the gas entry ports 302 and the primary gas deflecting means is arranged so that substantially the whole of the propulsive gas is discharged through the lower peripheral nozzle. The general flow of propulsive gas for take-off is indicated in FIGURE 26.

The flow of propulsive gas through the lower peripheral nozzle induces air to flow through the upper peripheral nozzle and also through the gas entry ports 302 and the lower slot 202. This induced flow of air helps to break away the flow of propulsive gases from the outboard body structure and, due to the Coanda effect, the propulsive gas passes downwardly and inboardly round the lower skin of the aircraft. It is found that with the controls in this position the gas ejected from the aircraft forms a downwardly moving tubular curtain of gas which curls outboardly adjacent to the ground as shown in FIGURE 26. Comparing FIGURE 26 with FIGURE 22 it will be seen that the inboard deflection of the gas is less in FIGURE 26 than in FIGURE 22, this is because the baffles on the outer body structure in the embodiment of FIGURE 22 are more efficient in breaking away the flow from the outboard body structure than is the flow of air induced through the outboard body structure in the embodiment of FIGURE 26. It is found that, with an arrangement similar to that shown in FIGURE 26 but without the central stabilizing nozzle, an annular zone of negative pressure occurs under the aircraft adjacent to the center thereof. To relieve this zone of negative pressure the central stabilizing nozzle 313 is provided and some propulsive gas is ejected from this nozzle: this eliminates the zone of negative pressure and increases the upthrust of the aircraft.

To change from hovering to forward flight, the pilot operates the switch 295 on his control column to move the slide 305 so that the apertures 310 in the slide move out of register with the gas entry ports in the rear portion of the outer body structure. At the same time the pilot operates his controls to move the primary gas deflecting means so that gas will flow radially outboardly through the outlet nozzle, i.e. so that the upper and lower baffles 220, 221 project into the gas displacement passage by equal amounts. With this setting of the controls, propulsive gas ejected from the rear portion of the outlet nozzle will flow over the upper and lower surfaces of the outboard body structure as indicated in FIGURE 27, since the gases are prevented from flowing round the upper and lower skins of the aircraft by virtue of the projection of the baffles of the primary gas deflection means.

Around the forward portion of the aircraft, propulsive gas enters the gas entry ports 302 and is deflected both upwardly and downwardly by the channel member 194 so that it appears as directing streams of gas directly upwardly and inboardly, and downwardly and inboardly, respectively. These directing streams of gas assist the remainder of the propulsive gas to flow upwardly and downwardly around the guide vanes 199 and 200, and rearwardly along the upper and lower surfaces of the aircraft. Gas ejected from the central stabilizing nozzle 313 joins the gas moving along the lower surface of the aircraft and passes rearwardly until it meets the gas ejected from the rear portion of the aircraft. It will be seen from FIGURE 27 that the resultant rearward flow is directed somewhat downwardly, and therefore the aircraft is propelled both upwardly and forwardly.

In all flight regimes, the control and stabilization of the aircraft of FIGURES 14, 15 and 16 in pitch, roll and yaw is precisely the same as for the aircraft described with reference to FIGURES 1 to 13.

Referring now to FIGURES 17 and 17A, these illustrate a control system having a zero phase angle between movement of the control shaft and resulting movement of the primary gas deflecting means. The system has no built-in damping, and the couple applied to the aircraft as a result of a disturbing force, either external or pilot induced, will amplify the gyro-couple applied to the aircraft by tilt of the rotor axis.

Using the directional convention set out above, if the aircraft is hovering and the pilot pushes his stick 10% to the right, the actuators 176, 178 and 179 will apply a pitching moment to the rotor through the control shaft. The rotor will acquire a pitch rate and will follow the gyroscopic laws.

FIGURE 35 shows the response of the aircraft of FIGURES 17 and 17A to a pilot moving his stick 10% to the right while the aircraft is hovering. The response is similar to the response shown in FIGURE 30 of the aircraft of FIGURES 1 to 13 for a similar input, except that the motion is undamped save by the aerodynamic damping due to the internal flow of gas through the gas displacement passage. Comparison of the graphs of FIGURE 35 with those of FIGURE 30 will show how the oscillations of the system are damped out by increasing the phase angle to 20°. That is to say, the response of FIGURE 35 differs essentially from the response of FIGURE 30 by the superimposition of an oscillation on the steady roll rate and the steady pitch rate of FIGURE 30 and also on the roll and pitch of the aircraft and of the rotor. While it would be possible to fly an aircraft having such control system it would be rather less comfortable for the pilot than the aircraft of FIGURES 1 to 13.

FIGURE 36 shows the response of an aircraft having the control system of FIGURES 18 and 18A which has a phase angle of 90°. Comparison of FIGURE 36 with FIGURES 35 and 30 shows that the response is similar to the responses in FIGURES 30 and 35 but is more damped than in either of said systems. Thus as the pilot applies a pitching moment to the rotor, the rotor acquires a pitch rate and follows the gyroscopic laws as shown in the graphs. In the final steady state the rotor has a displacement in roll and rather less a displacement in pitch. The tilted rotor operates the gas deflecting means to apply a couple to the aircraft which is similar to the couple applied to the aircraft in the response of FIGURE 30 but, due to the different phasing, the position of the rotor to apply the couple is different from FIGURE 30. It will be seen that the system is extremely well damped and therefore would be more comfortable to fly than the aircraft shown in FIGURES 1 to 13. However, a disadvantage of such a system is that the time required to produce a given rate would be unnecessarily large and therefore it is desirable to compromise between a zero phase angle and a 90° phase angle, to provide a system which is partially damped but yet has rapid response. Such a compromise can be obtained with a phase angle of 20° as described with reference to FIGURES 1 to 13 and to the responses shown in FIGURES 30 to 34.

Referring now to FIGURES 19, 20 and 21, the control and stabilization of the aircraft there shown in pitch, roll and yaw is, in all flight regimes, similar to the control of the aircraft of FIGURES 1 to 13. The only difference is in the operations required to change from hovering to forward flight.

For hovering, the primary gas deflecting means are arranged so that substantially the whole of the propulsive gas passes downwardly and inboardly through the lower peripheral nozzle. When the aircraft has risen to the desired height the pilot operates his controls to move the flaps 324 to their second position, but he retains the primary gas deflecting means in their original position so that substantially the whole of the propulsive gas is discharged through the lower peripheral nozzle. In forward flight, therefore, propulsive gas issues from the forward portion of the lower peripheral nozzle and passes inboardly and downwardly, whereas the gas which issues through the rear portion of the lower peripheral nozzle passes outboardly and downwardly. The aircraft is propelled forwardly and upwardly in a manner similar to the aircraft previously described. The upper peripheral nozzle is only employed for control purposes and the operation of the control system is the same as that of the control system described with reference to FIGURES 1 to 13.

The term "aircraft" is used in the specification and claims in its broadest connotation of a craft which is propelled through the air but is not necessarily sustained thereby. The term is intended to include, where appropriate, vehicles which do not fly in the generally accepted sense of the word but "skim" over the surface of land or water sustained by generally downwardly directed streams of propulsive gas.

It will be understood that the forms of the invention herewith shown and described are preferred examples and that various modifications can be carried out without departing from the spirit of the invention or the scope of the appended claims.

What we claim as our invention is:

1. A control system for an aircraft having a body structure; engine means within the structure to provide propulsive gas; and an outlet nozzle to discharge the propulsive gas at a multiplicity of positions distributed around the periphery of the structure; the control system comprising gas deflecting means associated with the nozzle and operable to variably control the flow characteristics of the propulsive gas discharged from the nozzle at any selected position of said multiplicity of positions; a rotor rotatable about a spin axis and having a neutral position relative to the body structure, the rotor being mounted within the structure to have a limited degree of universal movement; biasing means associated with the rotor to bias it to its neutral position and to allow relative movement between the rotor and the body structure with consequent tilting of the rotor from its neutral position when the aircraft acquires a rotational velocity about a turn axis lying normal to the spin axis; and a link system interposed between the rotor and the gas deflecting means to operate the latter in response to tilting of the rotor from its neutral position and in a manner determined by the tilted position of the rotor; individual links of the system being operatively coupled to correlated portions of the gas deflecting means spaced around the periphery; operation of the gas deflecting means as a result of a disturbance which imparts a rotational velocity to the aircraft about a turn axis controlling the flow characteristics of the propulsive gas discharged from the outlet nozzle to reduce the divergence of the aircraft incident upon said disturbance.

2. A control system for an aircraft having a body structure; engine means within the structure to provide propulsive gas; and an outlet nozzle to discharge the propulsive gas at a multiplicity of positions distributed around the periphery of the structure; the control system comprising gas deflecting means associated with the nozzle and operable to variably control the flow characteristics of the propulsive gas discharged from the nozzle at any selected position of said multiplicity of positions; a rotor rotatable about a spin axis and having a neutral position relative to the body structure, the rotor being mounted within the structure to have limited degree of universal movement; biasing means associated with the rotor to bias it to its neutral position and to allow relative movement between the rotor and the body structure with consequent tilting of the rotor from its neutral position when the aircraft acquires a rotational velocity about a turn axis lying normal to the spin axis; and a link system interposed between the rotor and the gas deflecting means to operate the latter in response to tilt of the rotor from its neutral position and in a manner determined by the tilted position of the rotor; individual links of the system being operatively coupled to correlated portions of the gas deflecting means spaced around the periphery and links operatively coupled to peripherally opposite portions of the gas deflecting means being interconnected; the response of the link system to tilt of the rotor causing operation of opposite peripheral portions of the gas deflecting means; operation of the gas deflecting means as a result of a disturbance which imparts a rotational velocity to the aircraft about a turn axis controlling the flow characteristics of the propulsive gas discharged from peripherally opposite portions of the outlet nozzle to apply a couple to the aircraft to reduce the divergence of the aircraft incident upon said disturbance.

3. A control system for an aircraft having a body structure; engine means within the structure to provide propulsive gas; and an outlet nozzle to discharge the propulsive gas at a multiplicity of positions distributed around the periphery of the structure; the control system comprising gas deflecting means associated with the nozzle and operable to variably control the flow characteristics of the propulsive gas discharged from the nozzle at any selected position of said multiplicity of positions; a rotor rotatable about a spin axis and having a neutral position relative to the body structure, the rotor mounted within the structure to have a limited degree of universal movement, biasing means associated with the rotor to bias it to its neutral position and to allow relative movement between the rotor and the body structure, with consequent tilting of the rotor from its neutral position and application of a gyro-couple to the aircraft, when the aircraft acquires a rotational velocity about a turn axis lying normal to the spin axis; and a link system interposed between the rotor and the gas deflecting means to operate the latter in response to tilt of the rotor from its neutral position and in a manner determined by the tilted position of the rotor; individual links of the system being operatively coupled to correlated portions of the gas deflecting means spaced around the periphery and links operatively coupled to peripherally opposite portions of the gas deflecting means being interconnected; the response of the link system to tilt of the rotor causing operation of opposite peripheral portions of the gas deflecting means lying adjacent to a control plane which contains the position of the spin axis corresponding to the neutral position of the rotor and is advanced in the direction of rotation of the rotor by a phase angle $\alpha$ relative to the plane containing the positions of the spin axis corresponding to the neutral and tilted positions of the rotor, the phase angle having a value of between 0° and 90° inclusive; operation of the gas deflecting means as a result of a disturbance which imparts a rotational velocity to the aircraft about a turn axis controlling the flow characteristics of the propulsive gas discharged from peripherally opposite portions of the outlet nozzle to apply a couple to the aircraft to reduce the divergence of the aircraft incident upon said disturbance, the couple having a first component proportional to cosine $\alpha$ and which amplifies said gyro-couple and a second component proportional to sine $\alpha$ and which directly opposes said rotational velocity.

4. A control system for an aircraft having a body structure; engine means within the structure to provide propulsive gas, the engine means including a rotor rotatable about a spin axis and having a neutral position relative to the body structure, the rotor having a limited degree of universal movement; a gas displacement passage along which the propulsive gas is impelled by the rotor; and an outlet nozzle communicating with the gas displacement passage and arranged to discharge the propulsive gas at a multiplicity of positions distributed around the periphery of the structure; the control system comprising biasing means associated with the rotor to bias it to its neutral position and to allow relative movement between the rotor and the body structure with consequent tilting of the rotor from its neutral position when the aircraft acquires a rotational velocity about a turn axis lying normal to the spin axis; gas deflecting means associated with the nozzle and operable to variably control the flow characteristics of the propulsive gas discharged from the nozzle at any selected position of said multiplicity of positions; and a link system interposed between the rotor and the gas deflecting means to operate the latter in response to tilt of the rotor from its neutral position and in a manner determined by the tilted position of the rotor; individual links of the system being operatively coupled to correlated portions of the gas deflecting means spaced around said periphery; operation of the gas deflecting means as a result of a disturbance which imparts a rotational velocity to the aircraft about a turn axis controlling the flow characteristics of the propulsive gas discharged from the outlet nozzle to reduce the divergence of the aircraft incident upon said disturbance.

5. A control system for an aircraft having a body structure; engine means within the structure to provide propulsive gas, the engine means including a rotor rotatable about a spin axis and having a neutral position relative to the body structure, the rotor having a limited degree of universal movement; a gas displacement passage along which the propulsive gas is impelled by the rotor; and an outlet nozzle communicating with the gas displacement passage and arranged to discharge the propulsive gas at a multiplicity of positions distributed around the periphery of the structure; the control system comprising biasing means associated with the rotor to bias it to its neutral position and to allow relative movement between the rotor and the body structure, with consequent tilting of the rotor from its neutral position and application of a gyro-couple to the aircraft, when the aircraft acquires a rotational velocity about a turn axis lying normal to the spin axis; gas deflecting means associated with the nozzle and operable to variably control the flow characteristics of the propulsive gas discharged from the nozzle at any selected position of said multiplicity of positions; and a link system interposed between the rotor and the gas deflecting means to operate the latter in response to tilt of the rotor from its neutral position and in a manner determined by the tilted position of the rotor; individual links of the system being operatively coupled to correlated portions of the gas deflecting means spaced around said periphery and links operatively coupled to peripherally opposite portions of the gas deflecting means being interconnected; the response of the link system to tilt of the rotor causing operation of opposite peripheral portions of the gas deflecting means lying adjacent to a control plane which contains the position of the spin axis corresponding to the neutral position of the rotor and is advanced in the direction of rotation of the rotor by a phase angle $\alpha$ relative to the plane containing the positions of the spin axis corresponding to the neutral and tilted positions of the rotor, the phase angle having a value between 0° and 90° inclusive; operation of the gas deflecting means as the result of a disturbance which imparts a rotational velocity to the aircraft about a turn axis controlling the flow characteristics of the propulsive gas discharged from peripherally opposite portions of the outlet nozzle to apply a couple to the aircraft to reduce the divergence of the aircraft incident upon said disturbance, the couple having a first component proportional to cosine $\alpha$ and which amplifies said gyro-couple and a second component proportional to sine $\alpha$ and which directly opposes said rotational velocity.

6. A control system for an aircraft having a body structure; engine means within the structure to provide propulsive gas; and an outlet nozzle arranged to discharge the propulsive gas at a multiplicity of positions distributed around the periphery of the structure; the control system comprising gas deflecting means associated with the nozzle and operable to variably control the flow characteristics of the propulsive gas discharged from the nozzle at any selected position of said multiplicity of positions; a rotor rotatable about a spin axis and being mounted within the structure to have a neutral position relative to the body structure, the rotor having a limited degree of universal movement; biasing means associated with the rotor to bias it to its neutral position and to allow relative movement between the rotor and the body structure with consequent tilting of the rotor from its neutral position when the aircraft acquires a rotational velocity about a turn axis lying normal to the spin axis; a link system interposed between the rotor and the gas deflecting means to operate the latter in response to tilt of the rotor from its neutral position and in a manner determined by the tilted position of the rotor; individual links of the system being operatively coupled to correlated portions of the gas deflecting means spaced around said periphery; operation of the gas deflecting means as the result of a disturbance which imparts rotational velocity to the aircraft about a turn axis controlling the flow characteristics of the propulsive gas discharged from the outlet nozzle to reduce the divergence of the aircraft incident upon said disturbance; and pilot operated means to operate all of said portions of the gas deflecting means in unison.

7. A control system for an aircraft having a body structure; engine means within the structure to provide propulsive gas; and an outlet nozzle arranged to discharge the propulsive gas at a multiplicity of positions distributed around the periphery of the structure; the control system comprising gas deflecting means associated with the nozzle and operable to variably control the flow characteristics of the propulsive gas discharged from the nozzle at any selected position of said multiplicity of positions; a rotor rotatable about a spin axis and having a neutral position relative to the body structure, the rotor being mounted within the structure to have a limited degree of universal movement; biasing means associated with the rotor to bias it to its neutral position and to allow relative movement between the rotor and the body structure with consequent tilting of the rotor from its neutral position when the aircraft acquires a rotational velocity about a turn axis lying normal to the spin axis; pilot operated means to apply a tilting moment to the rotor in a desired direction; and a link system interposed between the rotor and the gas deflecting means to operate the latter in response to tilt of the rotor from its neutral position and in a manner determined by the tilted position of the rotor; individual links of the system being operatively coupled to correlated portions of the gas deflecting means spaced around said periphery; operation of the gas deflecting means as a result of a disturbance which imparts a rotational velocity to the aircraft about a turn axis controlling the flow characteristics of the propulsive gas discharged from the outlet nozzle to reduce the divergence of the aircraft incident upon said disturbance and operation of said pilot means causing the rotor to tilt and operate the gas deflecting means to disturb the aircraft and to impart thereto a rotational velocity about a turn axis.

8. A control system for an aircraft having a body structure; engine means within the structure to provide propulsive gas, the engine means including a rotor rotatable about a spin axis and having a neutral position relative to the body structure, the rotor having a limited degree of universal movement; a gas displacement passage along which the propulsive gas is impelled by the rotor; and an outlet nozzle communicating with the gas displacement passage and arranged to discharge the propulsive gas at a multiplicity of positions distributed around the periphery of the structure; the control system comprising biasing means associated with the rotor to bias it to its neutral position and to allow relative movement between the rotor and the body structure with consequent tilting of the rotor from its neutral position when the aircraft acquires a rotational velocity about a turn axis lying normal to the spin axis; gas deflecting means associated with the nozzle and operable to variably control the flow characteristics of the propulsive gas discharged from the nozzle at any selected position of said multiplicity of positions; pilot operated means to apply a tilting moment to the rotor in a desired direction; and a link system interposed between the rotor and the gas deflecting means to operate the latter in response to tilt of the rotor from its neutral position and in a manner determined by the tilted position of the rotor; individual links of the system being operatively coupled to correlated portions of the gas deflecting means spaced around said periphery; operation of the gas deflecting means as a result of a disturbance which imparts a rotational velocity to the aircraft about a turn axis controlling the flow characteristics of the propulsive gas discharged from the outlet nozzle to reduce the divergence of the aircraft incident upon the disturbance and operation of said pilot operated means causing the rotor to tilt and operate the gas deflecting means to disturb the aircraft and to impart thereto a rotational velocity about a turn axis.

9. A control system for an aircraft having a body structure; engine means within the structure to provide propulsive gas; and an outlet nozzle to discharge the propulsive gas at a multiplicity of positions distributed around the periphery of the structure; the control system comprising gas deflecting means associated with the nozzle and operable to variably control the flow characteristics of the propulsive gas discharged from the nozzle at any selected position of said multiplicity of positions; a rotor rotatable about a spin axis and having a neutral position relative to the body structure, the rotor being mounted within the structure to have a limited degree of universal movement; biasing means associated with the rotor to bias it to its neutral position and to allow relative movement between the rotor and the body structure, with consequent tilting of the rotor from its neutral position and application of a gyro-couple to the aircraft, when the aircraft acquires a rotational velocity about a turn axis lying normal to the spin axis; first pilot operated means to apply a tilting moment to said rotor in a desired direction; a link system interposed between the rotor and the gas deflecting means to operate the latter in response to tilt of the rotor from its neutral position and in a manner determined by the tilted position of the rotor; individual links of the system being operatively coupled to correlated portions of the gas deflecting means spaced around the periphery and links operatively coupled to peripherally opposite portions of the gas deflecting means being interconnected; the response of the link system to tilt of the rotor causing operation of opposite peripheral portions of the gas deflecting means lying adjacent to a control plane which contains the position of the spin axis corresponding to the neutral position of the rotor and is advanced in the direction of rotation of the rotor by a phase angle $\alpha$ relative to the plane containing the positions of the spin axis corresponding to the neutral and tilted positions of the rotor, the phase angle having a value of between 0° and 90° inclusive; and second pilot operated means to operate all of said portions of the gas deflecting means in unison; operation of the gas deflecting means as a result of a disturbance which imparts a rotational velocity to the aircraft about a turn axis controlling the flow characteristics of the propulsive gas discharged from peripherally opposite portions of the outlet nozzle to apply a couple to the aircraft to reduce the divergence of the aircraft incident upon said disturbance, the couple having a first component proportional to cosine $\alpha$ and which amplifies said gyro-couple and the second component proportional to sine $\alpha$ and which directly opposes said rotational velocity; and operation of said first pilot operated means causing the rotor to tilt and operate the gas deflecting means to disturb the aircraft and to impart thereto a rotational velocity about a turn axis.

10. A control system for an aircraft having a body structure; engine means within the structure to provide propulsive gas, the engine means including a rotor rotatable about a spin axis and having a neutral position relative to the body structure, the rotor having a limited degree of universal movement; a gas displacement passage along which the propulsive gas is impelled by the rotor; and an outlet nozzle communicating with the gas displacement passage and arranged to discharge the propulsive gas at a multiplicity of positions distributed around the periphery of the structure; the control system comprising biasing means associated with the rotor to bias it to its neutral position and to allow relative movement between the rotor and the body structure, with consequent tilting of the rotor from its neutral position and application of a gyro-couple to the aircraft, when the aircraft acquires a rotational velocity about a turn axis lying normal to the spin axis; first pilot operated means to apply a tilting moment to the rotor in a desired direction; a link system interposed between the rotor and the gas deflecting means to operate the latter in response to tilt of the rotor from its neutral position and in a manner determined by the tilted position of the rotor; individual links of the system being operatively coupled to correlated portions of the gas deflecting means spaced around the periphery and links operatively coupled to peripherally opposite portions of the gas deflecting means being interconnected; the response of the link system to tilt of the rotor causing operation of opposite peripheral portions of the gas deflecting means lying adjacent to a control plane which contains the position of the spin axis corresponding to the neutral position of the rotor and is advanced in the direction of rotation of the rotor by a phase angle $\alpha$ relative to the plane containing the positions of the spin axis corresponding to the neutral and tilted positions of the rotor, the phase angle having a value of between 0° and 90° inclusive; and second pilot operated means to operate all of said portions of the gas deflecting means in unison; operation of the gas deflecting means as a result of a disturbance which imparts a rotational velocity to the aircraft about a turn axis controlling the flow characteristics of the propulsive gas discharged from peripherally opposite portions of the outlet nozzle to apply a couple to the aircraft to reduce the divergence of the aircraft incident upon said disturbance, the couple having a first component proportional to cosine $\alpha$ and which amplifies said gyro-couple and a second component proportional to sine $\alpha$ and which directly opposes said rotational velocity; and operation of said first pilot operated means causing the rotor to tilt and operate the gas deflecting means to disturb the aircraft and to impart thereto a rotational velocity about a turn axis.

11. A conrol system according to claim 10, including a control shaft arranged for rocking movement about a fulcrum fixed relatively to the body structure; means interconnecting one end of the control shaft and the rotor; a plurality of bell-cranks pivotally mounted on the control shaft; and an abutment movable relatively to the control shaft and co-operating with the bell-cranks to move the bell-cranks in unison; and wherein the link system comprises mechanical links radiating outboardly from the control shaft, each link being connected at its inboard end to one of said bell-cranks.

12. A control system according to claim 10, wherein the first pilot operated means includes a pilot's control column; a plurality of fluid conduits associated with the column, means associated with the column to vary the relative fluid pressures in said conduits upon movement of the column and a plurality of actuators connected to said conduits and arranged to apply a tilting moment to the rotor.

13. A control system according to claim 11, wherein the first pilot operated means comprises a pilot's control column; a plurality of fluid conduits associated with the column, means associated with the column to vary the relative fluid pressures in said conduits upon movement of the column and a plurality of actuators connected to said conduits and arranged to apply a tilting moment to said control shaft in a desired direction and thus apply a tilting moment to the rotor.

14. A control system according to claim 13, wherein the rotor is mounted in the body structure on spherical bearings arranged below the center of gravity of the rotor.

15. A control system for an aircraft having a lentiform body structure sheathed by opposed aerofoil surfaces which provide lift developing surfaces; engine means within the structure to provide propulsive gas, the engine means including a rotor rotatable about a spin axis and having a neutral position relative to the body structure, the rotor having a limited degree of universal movement; a gas displacement passage along which the propulsive gas is impelled by the rotor; and an outlet nozzle communicating with the gas displacement passage and arranged to discharge the propulsive gas at a multiplicity of positions distributed around the periphery of the structure; the control system comprising biasing means associated with the rotor to bias the rotor to its neutral position and to allow relative movement between the rotor and the body structure with consequent tilting of the rotor from its neutral position when the aircraft acquires a rotational velocity about a turn axis lying normal to the spin axis; gas deflecting means associated with the nozzle and operable to variably control the flow characteristics of the propulsive gas discharged from the nozzle at any selected position of said multiplicity of positions; and a link system interposed between the rotor and the gas deflecting means to operate the latter in response to tilt of the rotor from its neutral position and in a manner determined by the tilted position of the rotor; individual links of the system being operatively coupled to correlated portions of the gas deflecting means spaced around said periphery; operation of the gas deflecting means as a result of a disturbance which imparts a rotational velocity to the aircraft about a turn axis controlling the flow characteristics of the propulsive gas discharged from the outlet nozzle to reduce the divergence of the aircraft incident upon said disturbance.

16. A control system for an aircraft having a lentiform body structure sheathed by opposed aerofoil surfaces which provided lift developing surfaces; engine means within the structure to provide propulsive gas, the engine means including a rotor rotatable about a spin axis and having a neutral position relative to the body structure, the rotor having a limited degree of universal movement; a gas displacement passage along which the propulsive gas is impelled by the rotor; and an outlet nozzle communicating with the gas displacement passage and arranged to discharge the propulsive gas at a multiplicity of positions distributed around the periphery of the structure; the control system comprising biasing means associated with the rotor to bias the rotor to its neutral position and to allow relative movement between the rotor and the body structure, with consequent tilting of the rotor from its neutral position and application of a gyro-couple to the aircraft, when the aircraft acquires a rotational velocity about a turn axis lying normal to the spin axis; gas deflecting means associated with the nozzle and operable to variably control the flow characteristics of the propulsive gas discharged from the nozzle at any selected position of said multiplicity of positions; and a link system interposed between the rotor and the gas deflecting means to operate the latter in response to tilt of the rotor from its neutral position and in a manner determined by the tilted position of the rotor; individual links of the system being operatively coupled to correlated portions of the gas deflecting means spaced around said periphery and links operatively coupled to peripherally opposite portions of the gas deflecting means being interconnected; the response of the link system to tilt of the rotor causing operation of opposite peripheral portions of the gas deflecting means lying adjacent to a control plane which contains the position of the spin axis corresponding to the neutral position of the rotor and is advanced in the direction of rotation of the rotor by a phase angle α relative to the plane containing the positions of the spin axis corresponding to the neutral and tilted positions of the rotor, the phase angle having a value between 0° and 90° inclusive; operation of the gas deflecting means as the result of a disturbance which imparts a rotational velocity to the aircraft about a turn axis controlling the flow characteristics of the propulsive gas discharged from peripherally opposite portions of the outlet nozzle to apply a couple to the aircraft to reduce the divergence of the aircraft incident upon said disturbance, the couple having a first component proportional to cosine α and which amplifies said gyro-couple and a second component proportional to sine α and which directly opposes said rotational velocity.

17. A control system for an aircraft having a lentiform body structure sheathed by opposed aerofoil surfaces which provide lift developing surfaces; engine means within the structure to provide propulsive gas, the engine means including a rotor rotatable about a spin axis and having a neutral position relative to the body structure, the rotor having a limited degree of universal movement; a gas displacement passage along which the propulsive gas is impelled by the rotor; and an outlet nozzle communicating with the gas displacement passage and arranged to discharge the propulsive gas at a multiplicity of positions distributed around the periphery of the structure; the control system comprising biasing means associated with the rotor to bias it to its neutral position and to allow relative movement between the rotor and the body structure, with consequent tilting of the rotor from its neutral position and application of a gyro-couple to the aircraft, when the aircraft acquires a rotational velocity about a turn axis lying normal to the spin axis; first pilot operated means to apply a tilting moment to the rotor in a desired direction; a link system interposed between the rotor and the gas deflecting means to operate the latter in response to tilt of the rotor from its neutral position and in a manner determined by the tilted position of the rotor; individual links of the system being operatively coupled to correlated portions of the gas deflecting means spaced around the periphery and links operatively coupled to peripherally opposite portions of the gas deflecting means being interconnected; the response of the link system to tilt of the rotor causing operation of opposite peripheral portions of the gas deflecting means lying adjacent to a control plane which contains the position of the spin axis corresponding to the neutral position of the rotor and is advanced in the direction of rotation of the rotor by a phase angle α relative to the plane containing the positions of the spin axis corresponding to the neutral and tilted positions of the rotor, the phase angle having a value of between 0° and 90° inclusive; and second pilot operated means to operate all of said portions of the gas deflecting means in unison; operation of the gas deflecting means as a result of a disturbance which imparts a rotational velocity to the aircraft about a turn axis controlling the flow characteristics of the propulsive gas discharged from peripherally opposite portions of the outlet nozzle to apply a couple to the aircraft to reduce the divergence of the aircraft incident upon said disturbance, the couple having a first component proportional to cosine α and which amplifies said gyro-couple and a second component proportional to sine α and which directly opposes said rotational velocity; and operation of said first pilot operated means causing the rotor to tilt and operate the gas deflecting means to disturb the aircraft and to impart thereto a rotational velocity about a turn axis.

References Cited in the file of this patent

UNITED STATES PATENTS

| | | |
|---|---|---|
| 2,461,435 | Neumann et al. | Feb. 8, 1949 |
| 2,822,755 | Edwards et al. | Feb. 11, 1958 |

FOREIGN PATENTS

| | | |
|---|---|---|
| 968,079 | France | Apr. 12, 1950 |
| 1,070,544 | France | Feb. 24, 1954 |
| 789,098 | Great Britain | Jan. 15, 1958 |

UNITED STATES PATENT OFFICE
CERTIFICATE OF CORRECTION

Patent No. 3,051,417                          August 28, 1962

John Carver Meadows Frost et al.

It is hereby certified that error appears in the above numbered patent requiring correction and that the said Letters Patent should read as corrected below.

In the grant, lines 3 and 13, and in the heading to the printed specification, line 5, name of assignee, for "Avco Aircraft Limited", each occurrence, read -- Avro Aircraft Limited --.

Signed and sealed this 18th day of December 1962.

(SEAL)
Attest:

ERNEST W. SWIDER                           DAVID L. LADD
Attesting Officer                              Commissioner of Patents